(12) United States Patent
Wakabayashi et al.

(10) Patent No.: US 8,641,195 B2
(45) Date of Patent: Feb. 4, 2014

(54) IMAGE FORMING APPARATUS FOR PROJECTING AN IMAGE TO GUIDE AN INDIVIDUAL

(75) Inventors: Shuichi Wakabayashi, Okaya (JP); Norio Nakamura, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 462 days.

(21) Appl. No.: 13/013,089

(22) Filed: Jan. 25, 2011

(65) Prior Publication Data

US 2011/0205497 A1 Aug. 25, 2011

(30) Foreign Application Priority Data

Feb. 19, 2010 (JP) ................................. 2010-034384

(51) Int. Cl.
*G03B 21/26* (2006.01)

(52) U.S. Cl.
USPC .............................................. 353/28; 353/46

(58) Field of Classification Search
USPC .................... 353/28, 46, 48; 340/555–557
See application file for complete search history.

(56) References Cited

U.S. PATENT DOCUMENTS

| 7,664,598 B2 | 2/2010 | Yamamoto et al. | |
| 2005/0141069 A1* | 6/2005 | Wood et al. | 359/196 |
| 2009/0284714 A1* | 11/2009 | Kogo et al. | 353/48 |
| 2009/0303447 A1* | 12/2009 | Turner et al. | 353/51 |

FOREIGN PATENT DOCUMENTS

| JP | 08-055282 | 2/1996 |
| JP | 2007-149053 | 6/2007 |
| JP | 4010273 | 9/2007 |
| JP | 2008-116668 | 5/2008 |
| WO | WO2006-080344 | 8/2006 |

* cited by examiner

*Primary Examiner* — Francis M Legasse, Jr.
(74) *Attorney, Agent, or Firm* — Harness, Dickey & Pierce, P.L.C.

(57) ABSTRACT

An image forming apparatus includes: a projector configured to be capable of projecting light to thereby display an image on a rendering region formed on a display surface set around a guiding point to which a person should be guided and changing a position of the rendering region; a detecting unit that detects whether a person is present in a detection region set near the display surface and detects, when a person is present in the detection region, a moving state of the person; and a control unit that controls, on the basis of a detection result of the detecting unit, driving of the projector to guide the person present in the detection region to the guiding point.

12 Claims, 24 Drawing Sheets

IMAGE FORMING APPARATUS FOR PROJECTING AN IMAGE TO GUIDE AN INDIVIDUAL

BACKGROUND

1. Technical Field

The present invention relates to an image forming apparatus.

2. Related Art

A projector is known as an apparatus that projects light on the surface of an object such as a screen and displays a desired image on a projection surface of the screen. As such a projector, a projector including an optical scanner that one-dimensionally or two-dimensionally scans light is put to practical use (see, for example, JP-A-2008-116668 (Patent Document 1)).

The projector disclosed in Patent Document 1 includes a first optical scanner in which a movable plate having a light reflecting section pivots around an x axis, a second optical scanner in which a movable plate having a light reflecting section pivots around a y axis orthogonal to the x axis, and a light source device that emits light such as a laser. Such a projector scans light emitted from the light source device with the first optical scanner and further scans the scanned light with the second optical scanner to thereby two-dimensionally scan the light and display a desired image on the screen.

In recent years, in the field of digital signage, for example, it is proposed to set a screen around a store and display a predetermined image on the screen using the projector explained above to thereby advertise commodities or services targeting people around the screen.

However, in the projector disclosed in Patent Document 1, a display position of an image (a position of a rendering region as a region where the image is displayed) is fixed. Therefore, it is difficult for a person to recognize the presence and the content of the image. In particular, when the person is moving, time in which the person can recognize the presence and the content of the image is reduced. Therefore, it is difficult for the person to recognize the presence and the content of the image.

When a setting position of the screen is relatively distant from the store (a point to which the store desires to guide a person), even if it is possible to allow the person to recognize the presence and the content of the image, it is difficult to guide the person to the store. Therefore, effects of the advertisement (appeal effects) cannot be sufficiently obtained.

SUMMARY

An advantage of some aspects of the invention is to provide an image forming apparatus that can allow even a moving person to easily recognize the presence and the content of an image and can guide a target person to a desired point (a guiding point).

According to an aspect of the invention, there is provided an image forming apparatus including: a projector configured to be capable of projecting light to thereby display an image on a rendering region formed on a display surface set around a guiding point to which a person should be guided and changing the position of the rendering region; a detecting unit that detects whether a person is present in a detection region set near the display surface and detects, when a person is present in the detection region, a moving state of the person; and a control unit that controls, on the basis of a detection result of the detecting unit, driving of the projector to guide the person present in the detection region to the guiding point.

Consequently, even if a person is moving, it is possible to display an image in a position where the person can easily see the image. Therefore, it is possible to allow even the moving person to easily recognize the presence and the content of the image.

To guide a person present in the detection region to the guiding position, for example, it is possible to display, to the target person, an image in a position and with content for urging guidance to the guiding point. Therefore, it is possible to guide the target person to a desired point (the guiding point).

In the image forming apparatus according to the aspect of the invention, the projector may be configured to be capable of continuously or intermittently changing the position of the rendering region.

This allows a moving person to easily recognize the presence or the content of an image.

In the image forming apparatus according to the aspect of the invention, the control unit may control, when the person is moving in the detection region, the driving of the projector to change the position of the rendering region while maintaining a state in which the center of the rendering region is located on a forward side in a moving direction of the person and on the guiding point side with respect to the person.

Consequently, since an image is displayed on a front side (a field of view) of the moving person, the moving person can easily recognize the presence and the content of the image. It is possible to direct the line of sight of the target person to the guiding point side by displaying the image in a position on the guiding point side with respect to the moving direction of the moving person. As a result, the target person is guided to the guiding point consciously or unconsciously.

In the image forming apparatus according to the aspect of the invention, the control unit may control, when the person is moving in the detection region, the driving of the projector to maintain the position of the rendering region at a fixed separation distance from the position of the person.

This allows the moving person to easily see the presence and the content of the image.

In the image forming apparatus according to the aspect of the invention, the detecting unit may detect the position, the moving direction, and the moving speed of the person as the moving state of the person.

This makes it possible to predict the movement of the person. Therefore, it is possible to display, to the moving person, the image in a desired position.

In the image forming apparatus according to the aspect of the invention, the detecting unit may include: a human sensor that detects whether a person is present in the detection region and detects, when a person is present in the detection region, the position of the person; a storing section that stores, at every predetermined time, the position detected by the human sensor as position information; and a calculating section that calculates the moving direction and the moving speed of the person on the basis of the position information stored in the storing section.

Consequently, the detecting unit can detect the position, the moving direction, and the moving speed of the person with a relatively simple and inexpensive configuration.

In the image forming apparatus according to the aspect of the invention, the projector may include a distortion correcting unit that corrects distortion of the rendering region and the image, and the control unit may control driving of the distortion correcting unit on the basis of a detection result of the detecting unit.

This makes it possible to display the image to allow the person to easily see the image even if the position of the rendering region is changed.

In the image forming apparatus according to the aspect of the invention, the control unit may control the driving of the distortion correcting unit to fix the directions of the rendering region and the image with respect to the person.

This allows the moving person to easily see the content of the image.

In the image forming apparatus according to the aspect of the invention, the control unit may control the driving of the distortion correcting unit to fix the shape of the rendering region.

This allows the moving person to easily see the content of the image.

In the image forming apparatus according to the aspect of the invention, the control unit may control the driving of the distortion correcting unit to fix the dimension of the rendering region.

This allows the moving person to easily see the content of the image.

In the image forming apparatus according to the aspect of the invention, the projector may include: a light emitting unit that emits a laser beam; and a light scanning unit that scans the laser beam emitted from the light emitting unit in a first direction and a second direction orthogonal to each other.

Consequently, since the projector uses the laser beam, the projector is focus-free and can perform near projection. The position of the rendering region can be adjusted to an arbitrary position without being limited by a setting position of the projector. When the laser beam is used, an optical system such as a lens for changing the laser beam to parallel rays can be omitted or simplified. Therefore, it is possible to realize a reduction in the size of the light emitting unit and a reduction in the size of the image forming apparatus.

In the image forming apparatus according to the aspect of the invention, the projector may include a unit pivoting unit that pivots the light emitting unit and the light scanning unit integrally around at least one axis of two axes orthogonal to each other.

This makes it possible to increase a range in which the display position of the image (the position of the rendering region) can be changed (a range in which the image can be displayed). It is unnecessary to separately perform alignment adjustment for the light emitting unit and the light scanning unit to change the position of the rendering region. It is easily to design and manufacture the projector.

In the image forming apparatus according to the aspect of the invention, the light scanning unit may include an optical scanner in which a movable plate including a light reflecting section that reflects the light emitted from the light emitting unit is provided pivotably around one axis or two axes orthogonal to each other, the optical scanner scanning the light reflected by the light reflecting section according to the pivoting.

This makes it possible to configure the projector relatively simple and small.

In the image forming apparatus according to the aspect of the invention, the projector may include a scanner pivoting unit that pivots the entire optical scanner around at least one axis of the two axes orthogonal to each other with respect to light emitting unit.

This makes it possible to increase a range in which the display position of the image (the the position of the rendering region) can be changed (a range in which the image can be displayed).

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention are explained below with reference to the accompanying drawings.

First Embodiment

Figure 1:
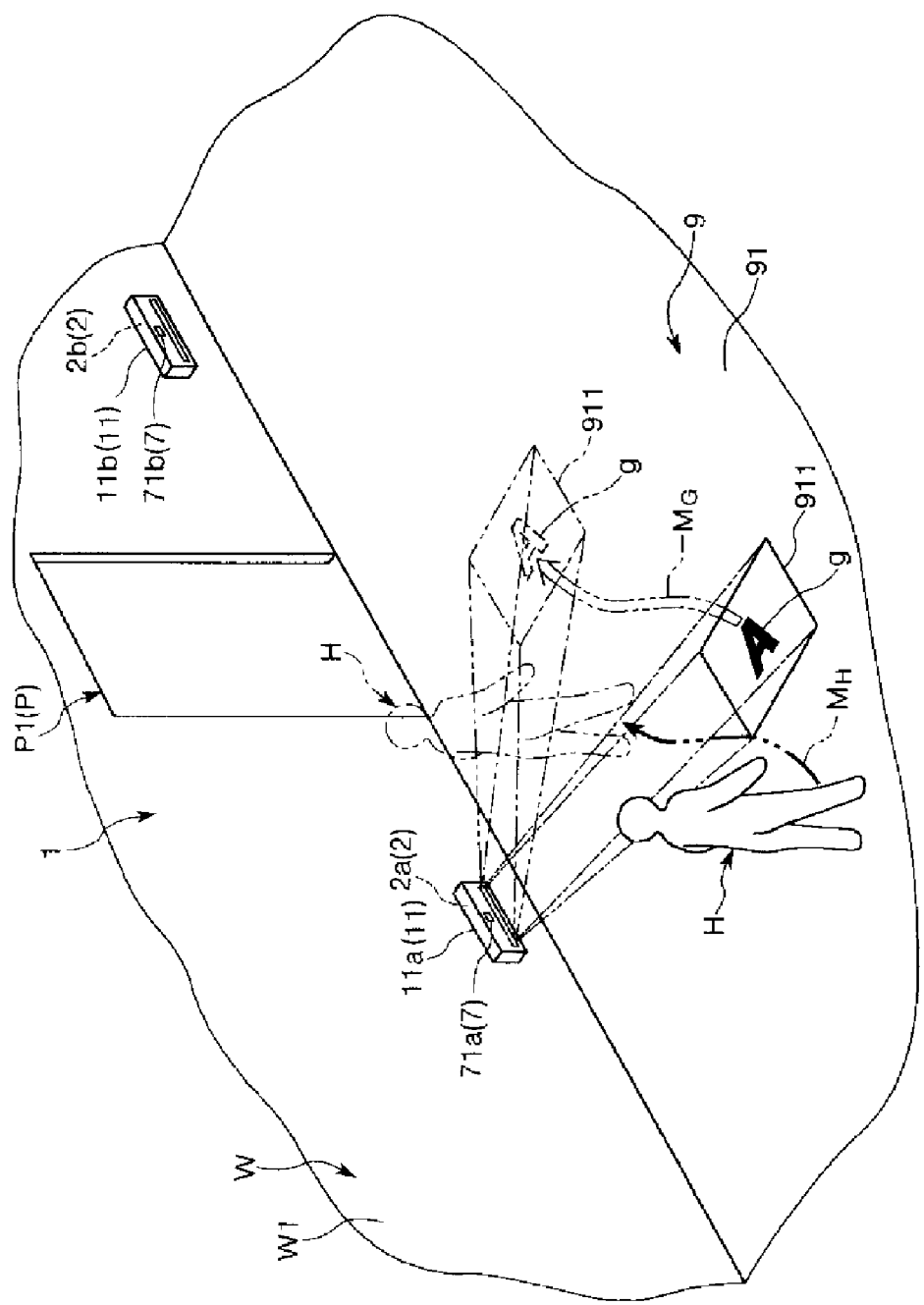
FIG. 1 is a diagram showing an image forming apparatus according to a first embodiment of the invention.
Figure 2:
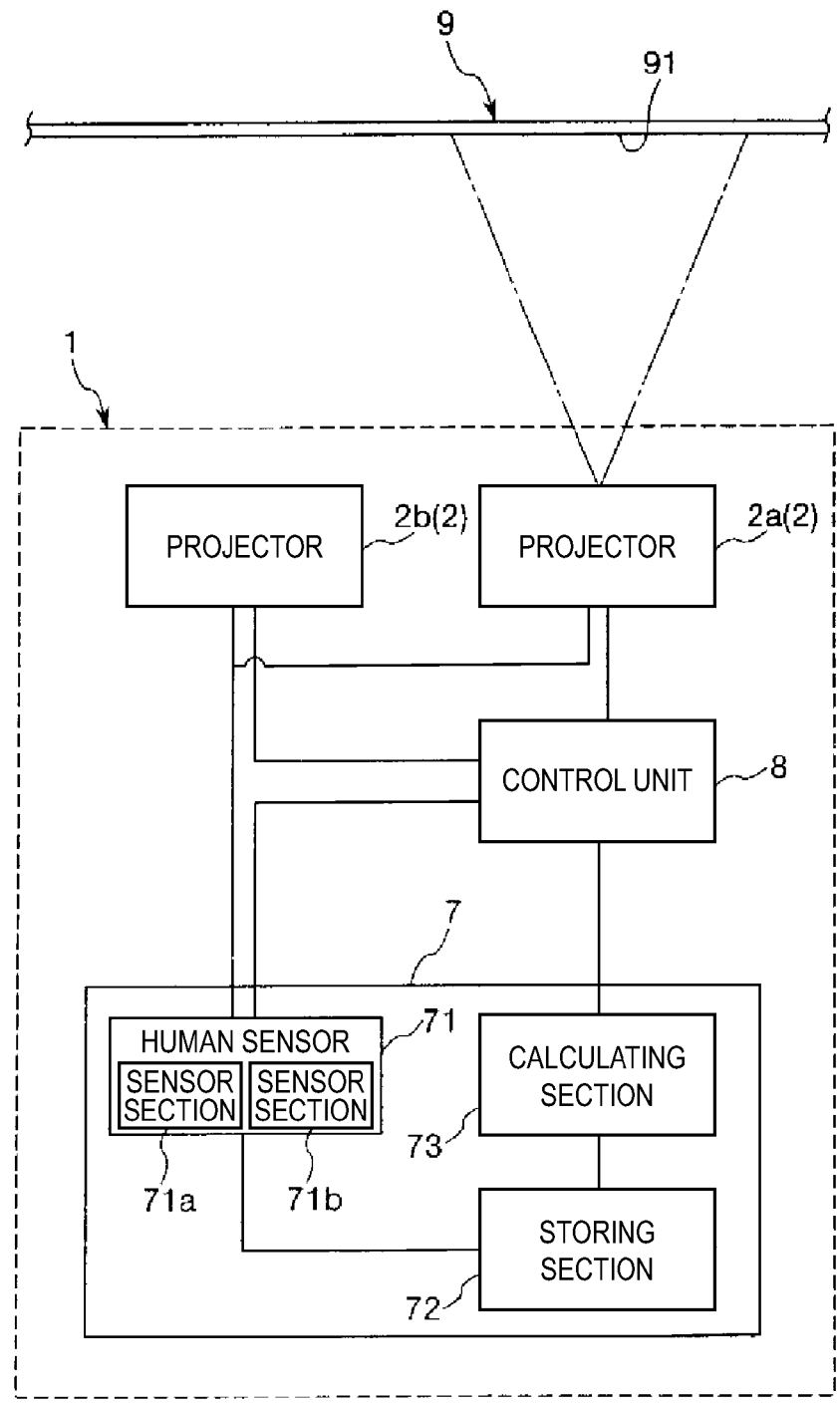
FIG. 2 is a block diagram showing a schematic configuration of the image forming apparatus shown in FIG. 1.
Figure 3:
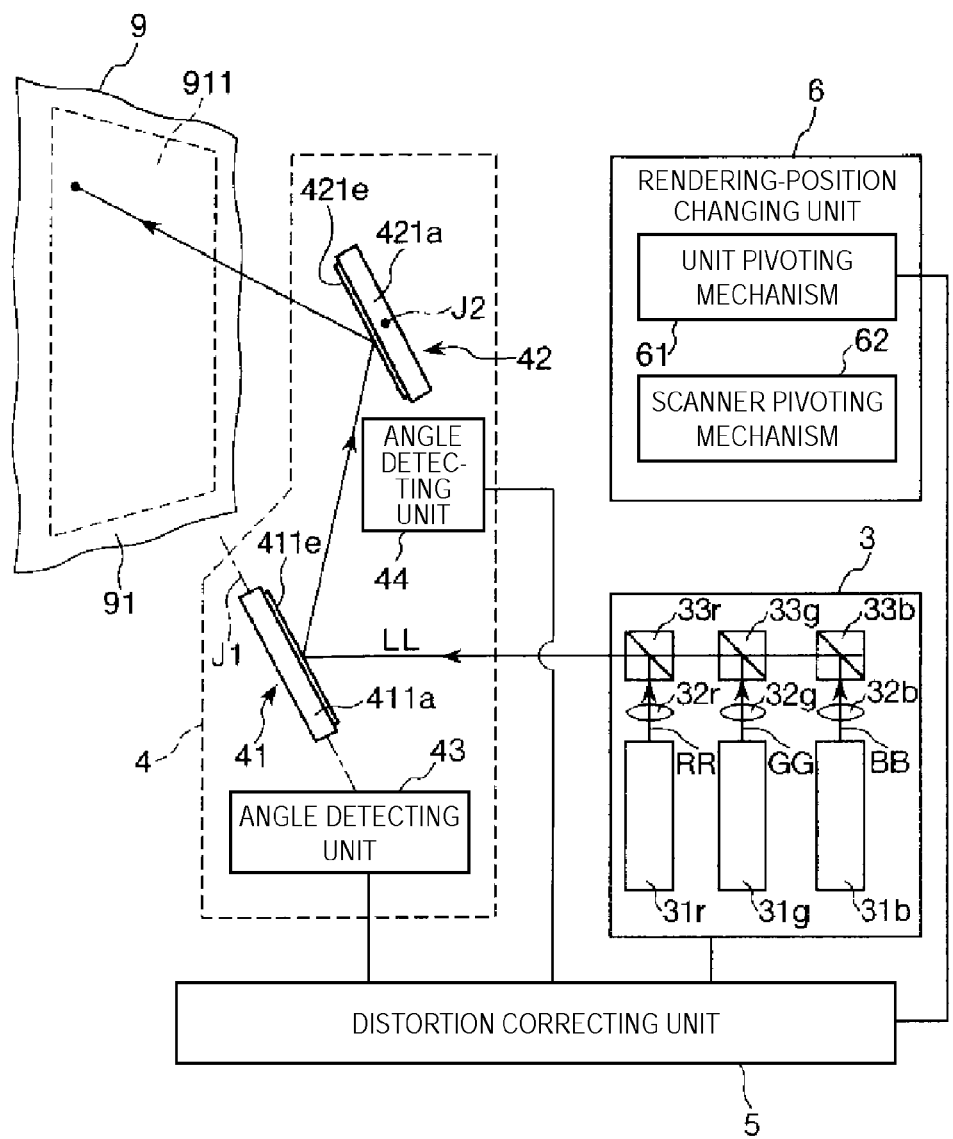
FIG. 3 is a diagram showing a schematic configuration of a projector included in the image forming apparatus shown in FIG. 2.
Figure 4:
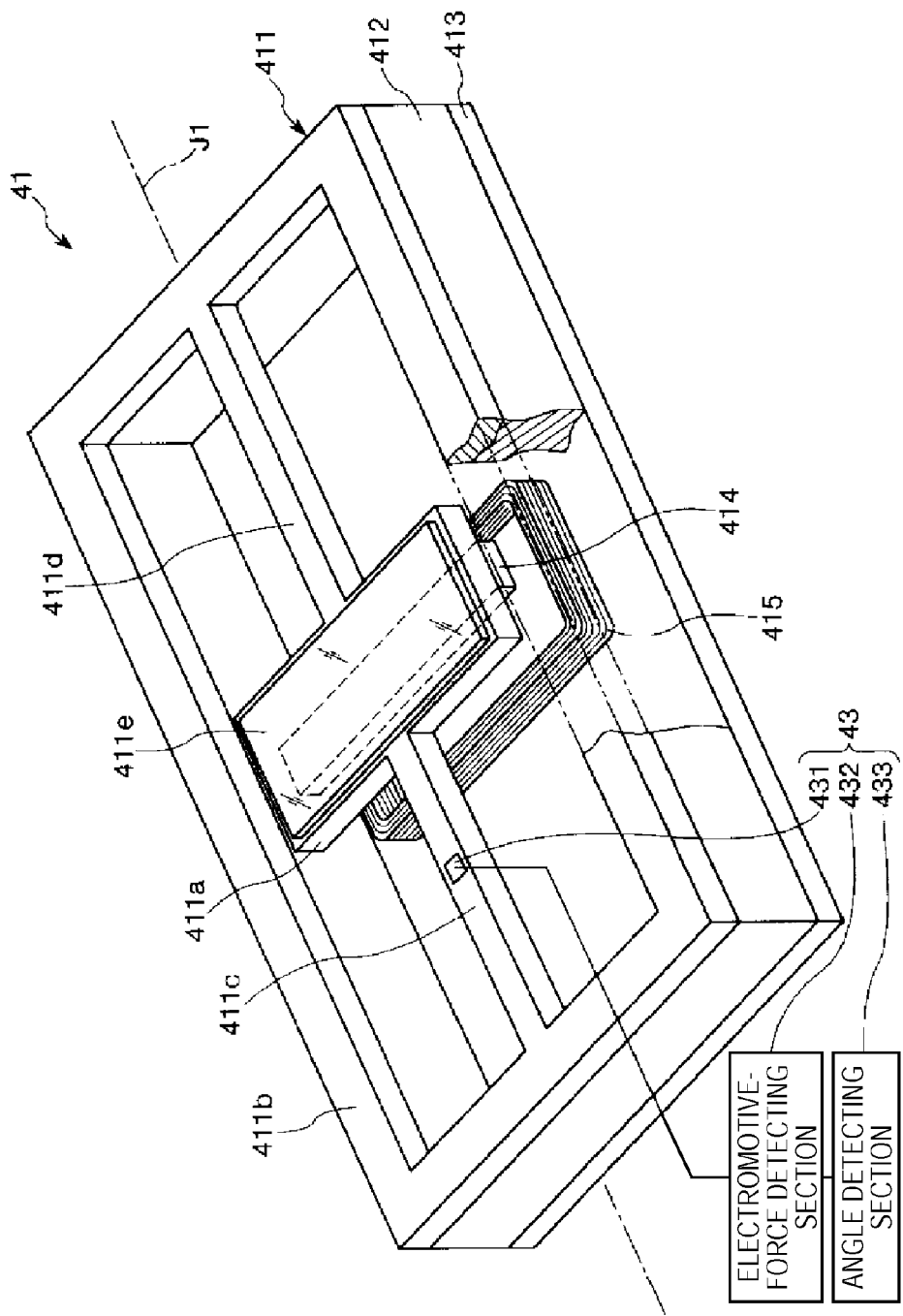
FIG. 4 is a partial sectional perspective view of an optical scanner included in the projector shown in FIG. 3.
Figure 5A:
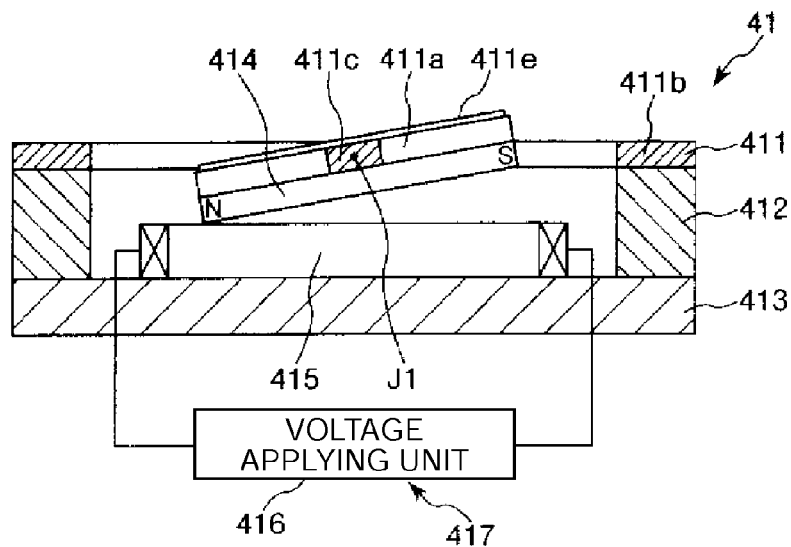
FIGS. 5A and 5B are sectional views for explaining the operation of the optical scanner shown in FIG. 4.
Figure 5B:
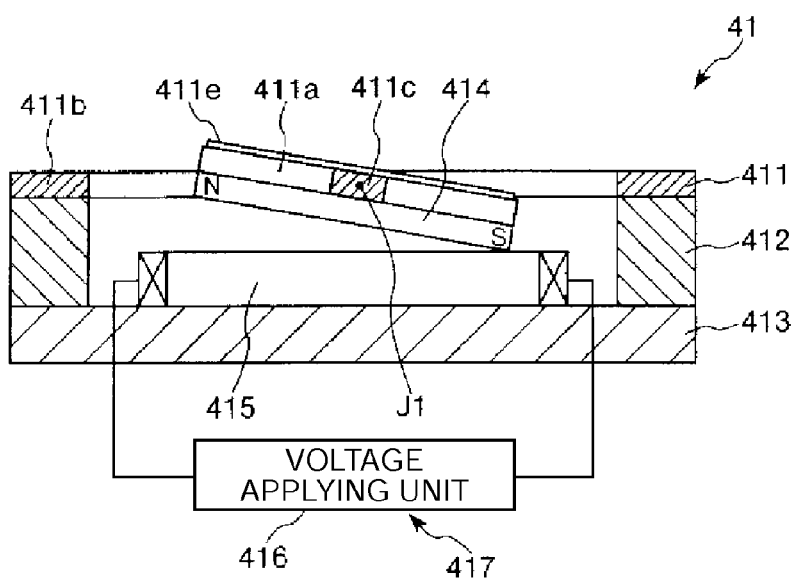
Figure 6:
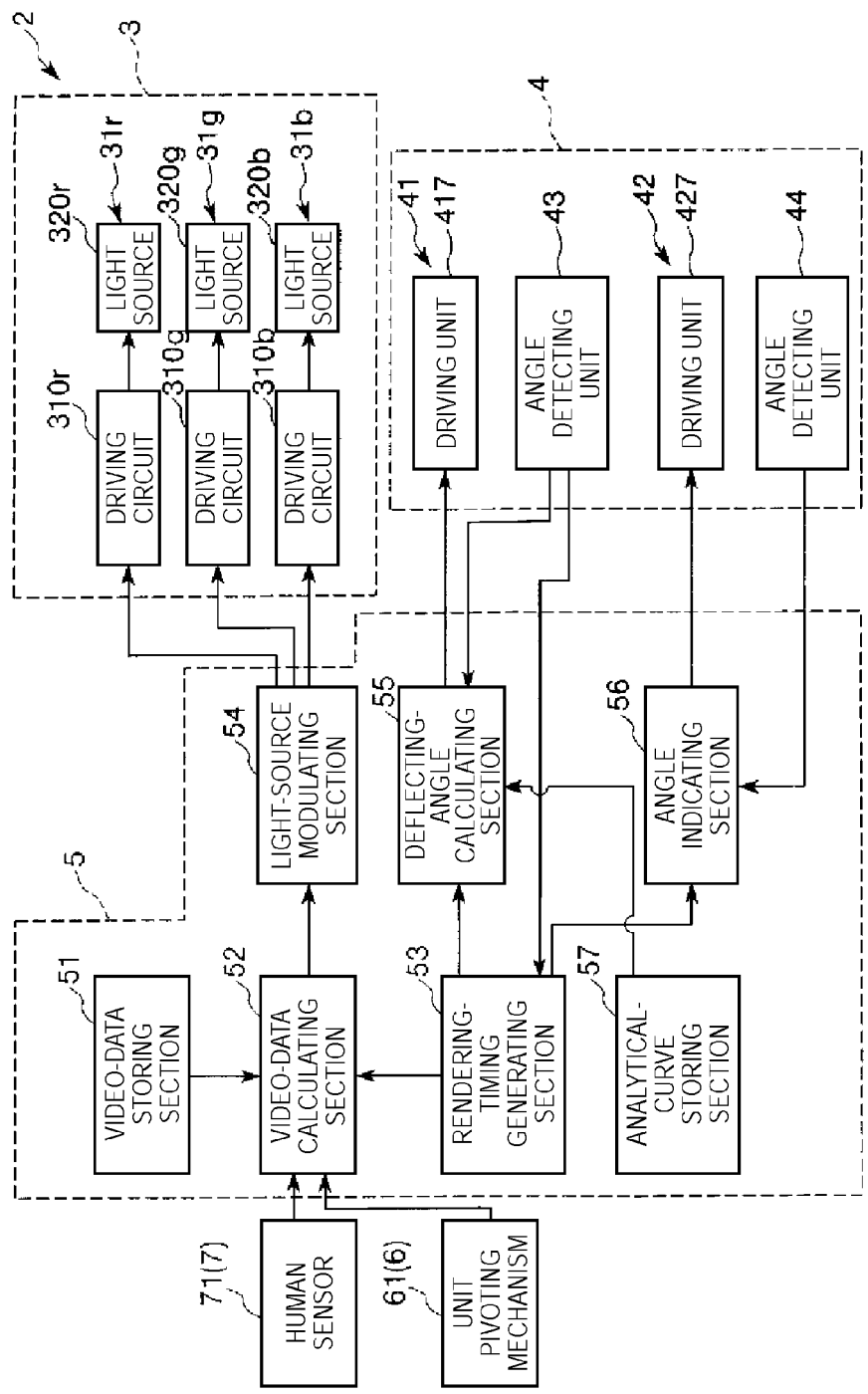
FIG. 6 is a block diagram showing a control system (an actuation control unit, a light scanning unit, and a light source unit) of the projector shown in FIG. 3.
Figure 7:
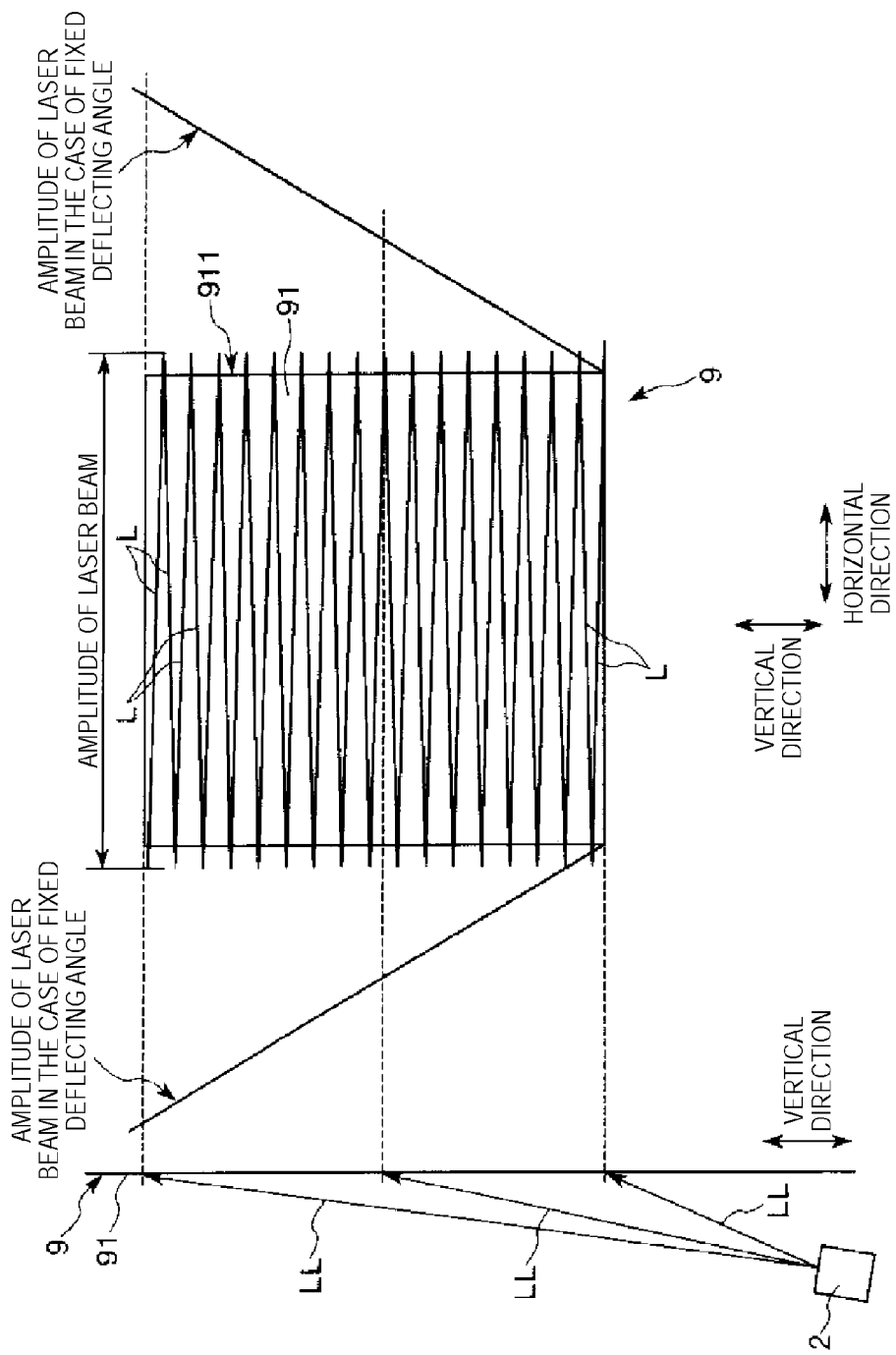
FIG. 7A is a side view for explaining the operation of the projector shown in FIG. 3.
FIG. 7B is a front view for explaining the operation of the projector shown in FIG. 3.
Figure 8:
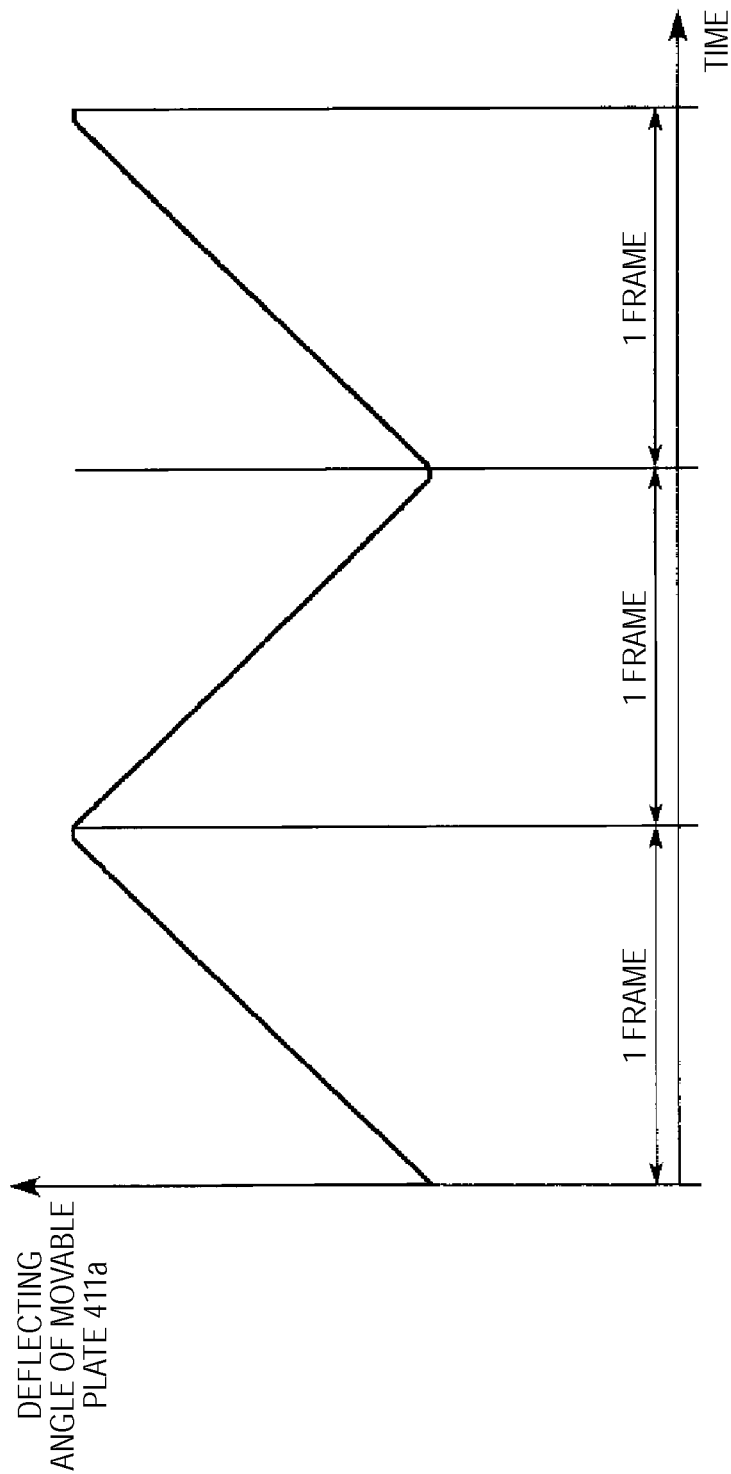
FIG. 8 is a graph showing transition of a deflecting angle (a change with time of the deflecting angle) of a movable plate of an optical scanner (an optical scanner for horizontal scanning) during actuation of the projector shown in FIG. 3.
Figure 9:
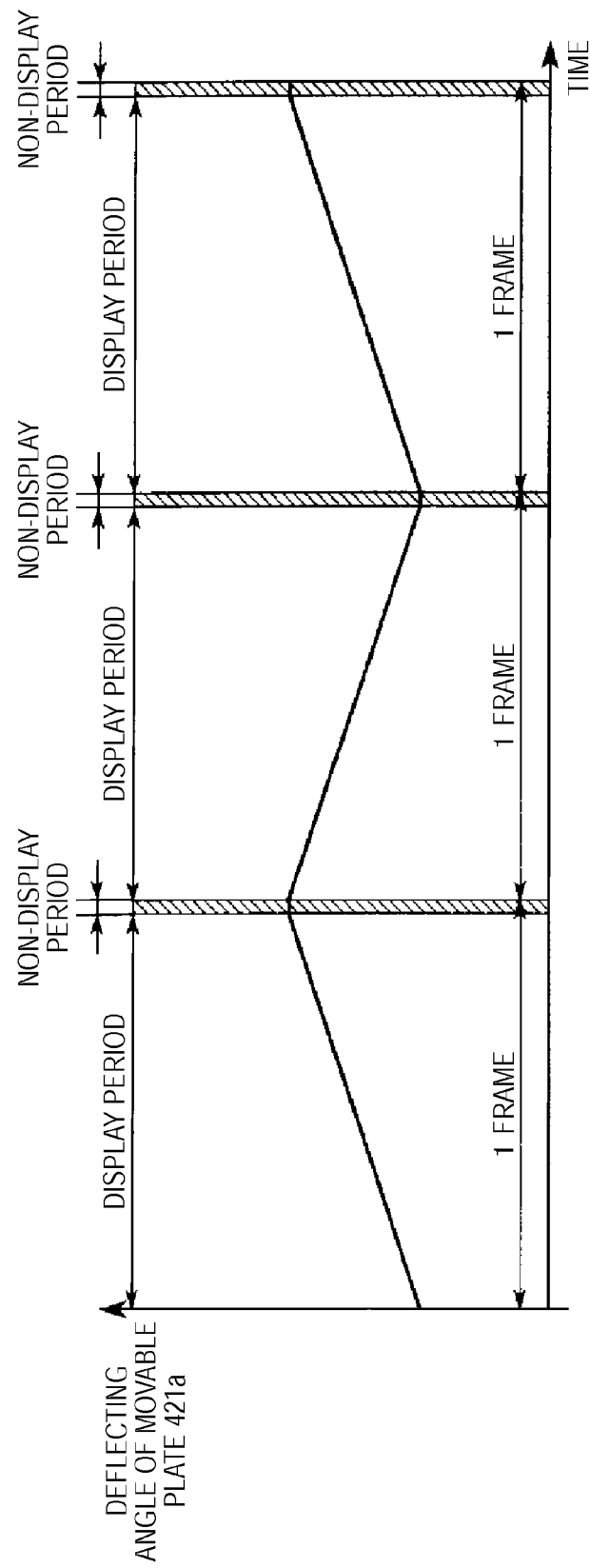
FIG. 9 is a graph showing transition of a deflecting angle (a change with time of the deflecting angle) of a movable plate of an optical scanner (an optical scanner for vertical scanning) during actuation of the projector shown in FIG. 3.
Figure 10:
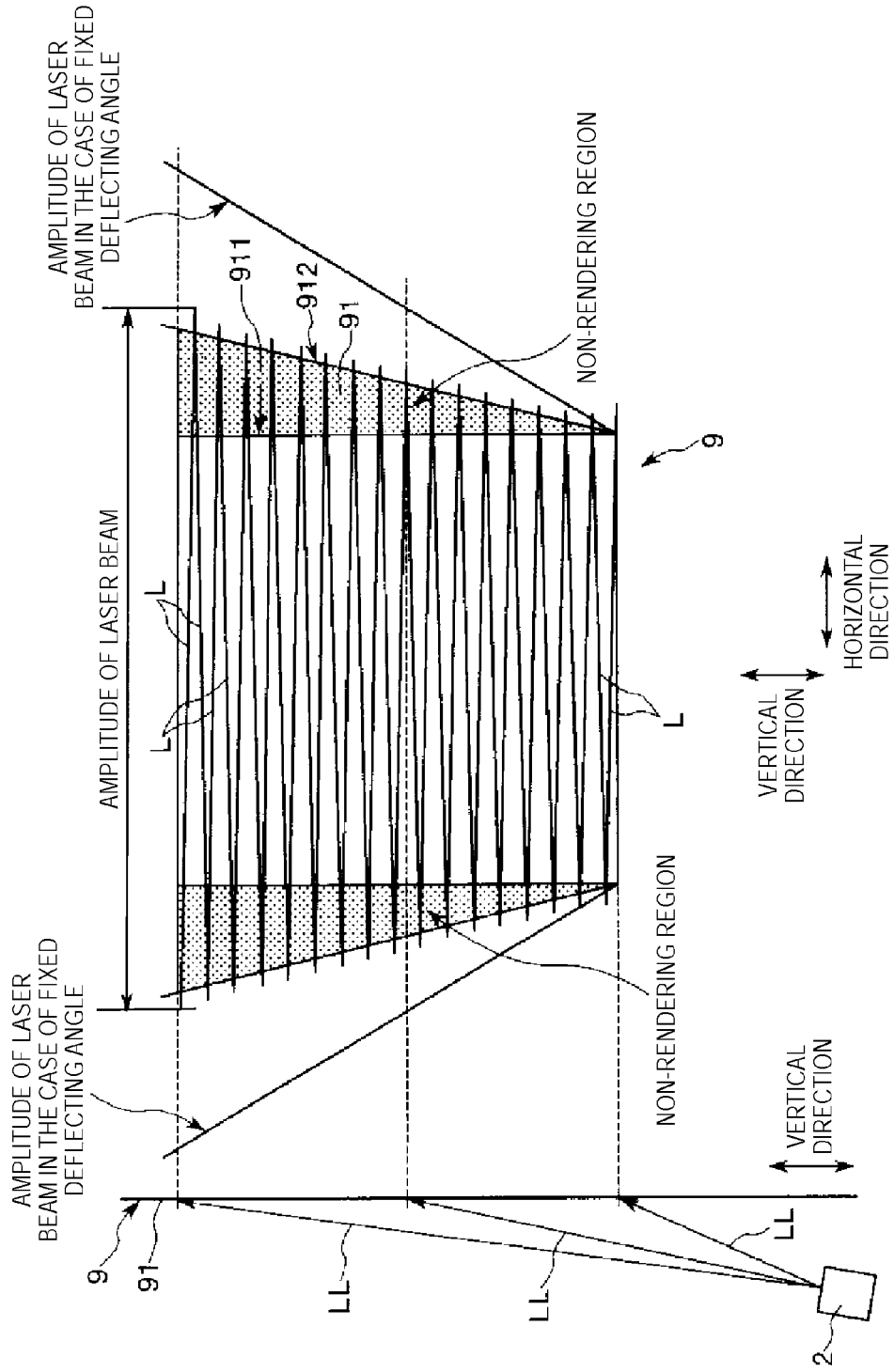
FIG. 10A is a side view showing a modification of the operation of the projector shown in FIG. 3.
FIG. 10B is a front view of the modification of the operation of the projector shown in FIG. 3.
Figure 11:
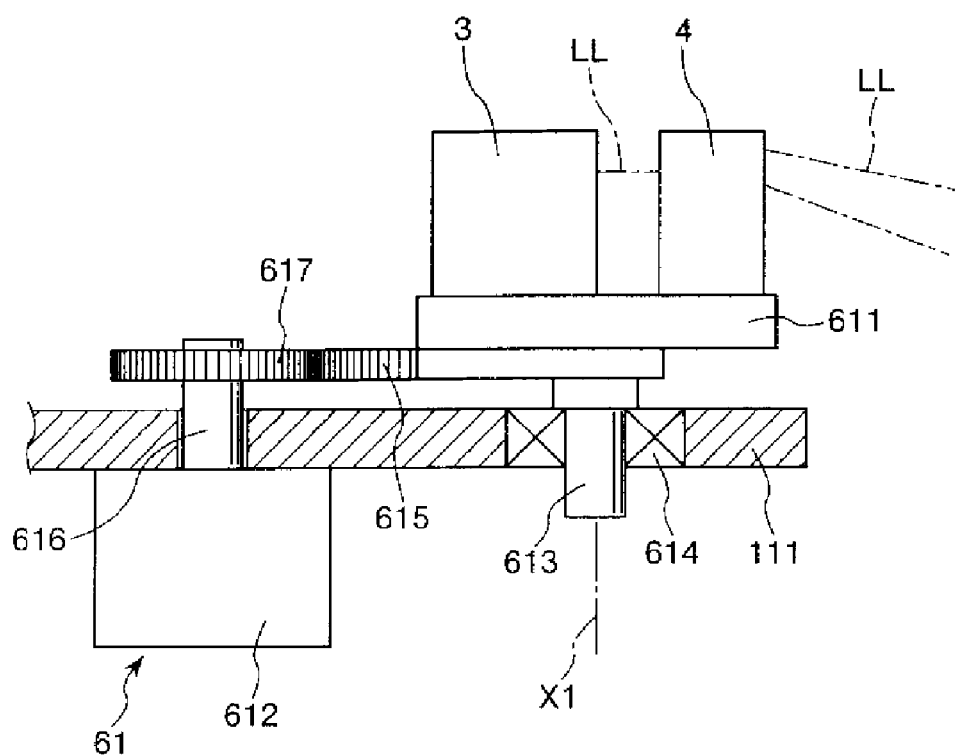
FIG. 11 is a partial sectional side view showing the projector and a supporting section pivoting unit included in the image forming apparatus shown in FIG. 2.
Figure 12B:
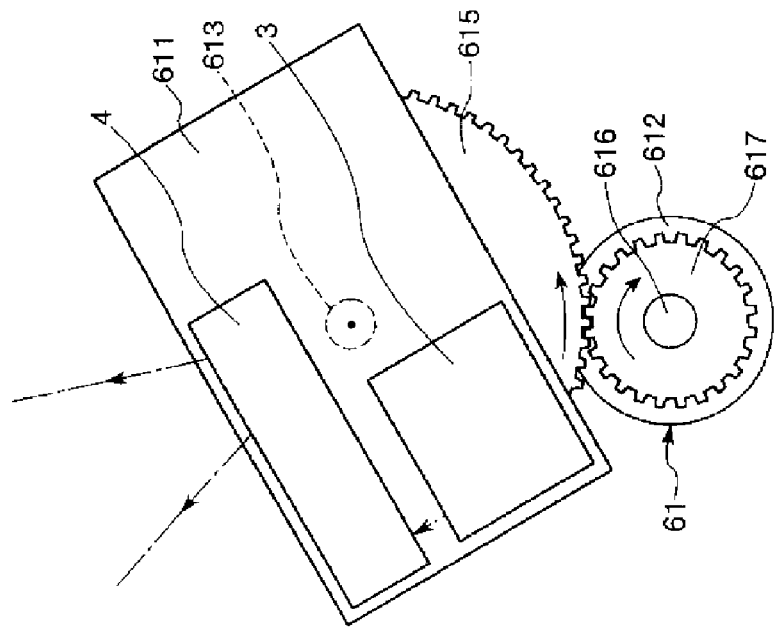
FIGS. 12A and 12B are top views for explaining the action of the supporting section pivoting unit shown in FIG. 11.
Figure 12A:
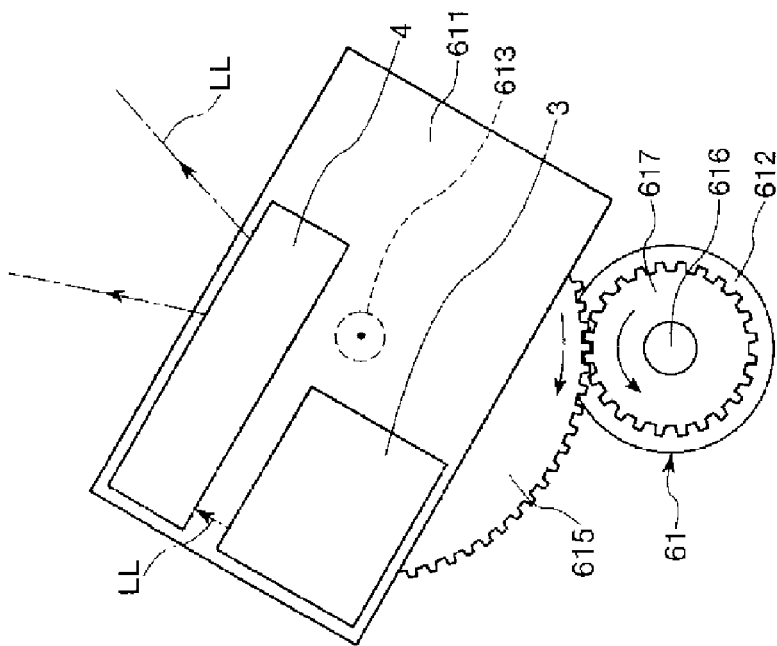
Figure 13:
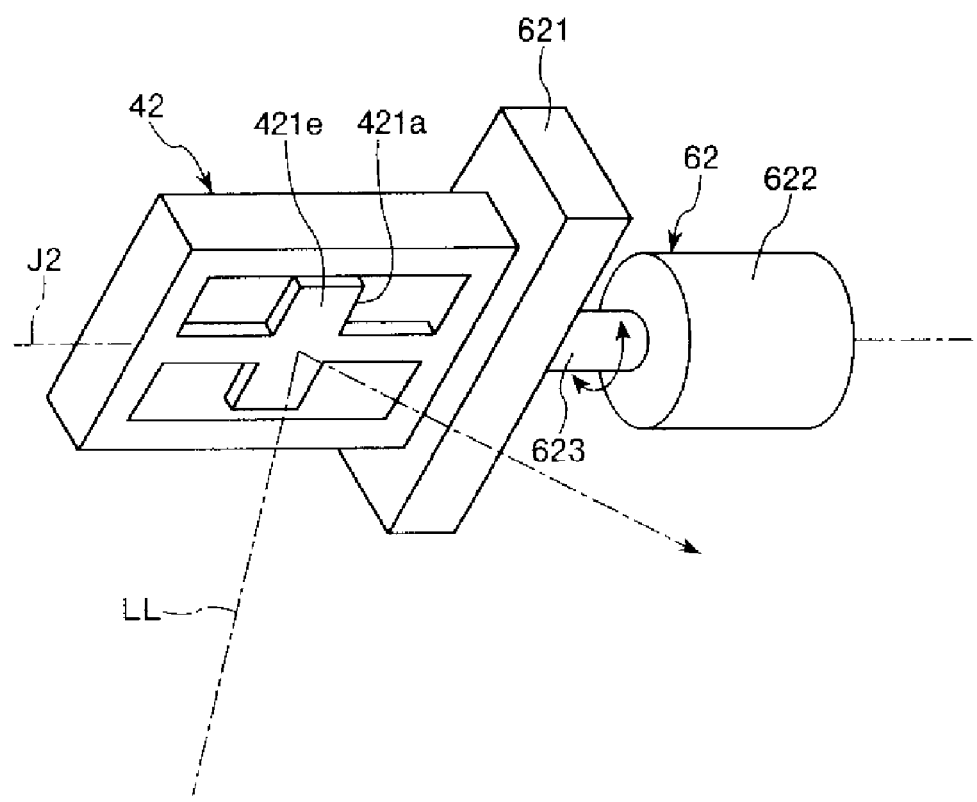
FIG. 13 is a perspective view showing a scanner pivoting unit included in the light scanning unit of the projector shown in FIG. 11.
Figure 14:
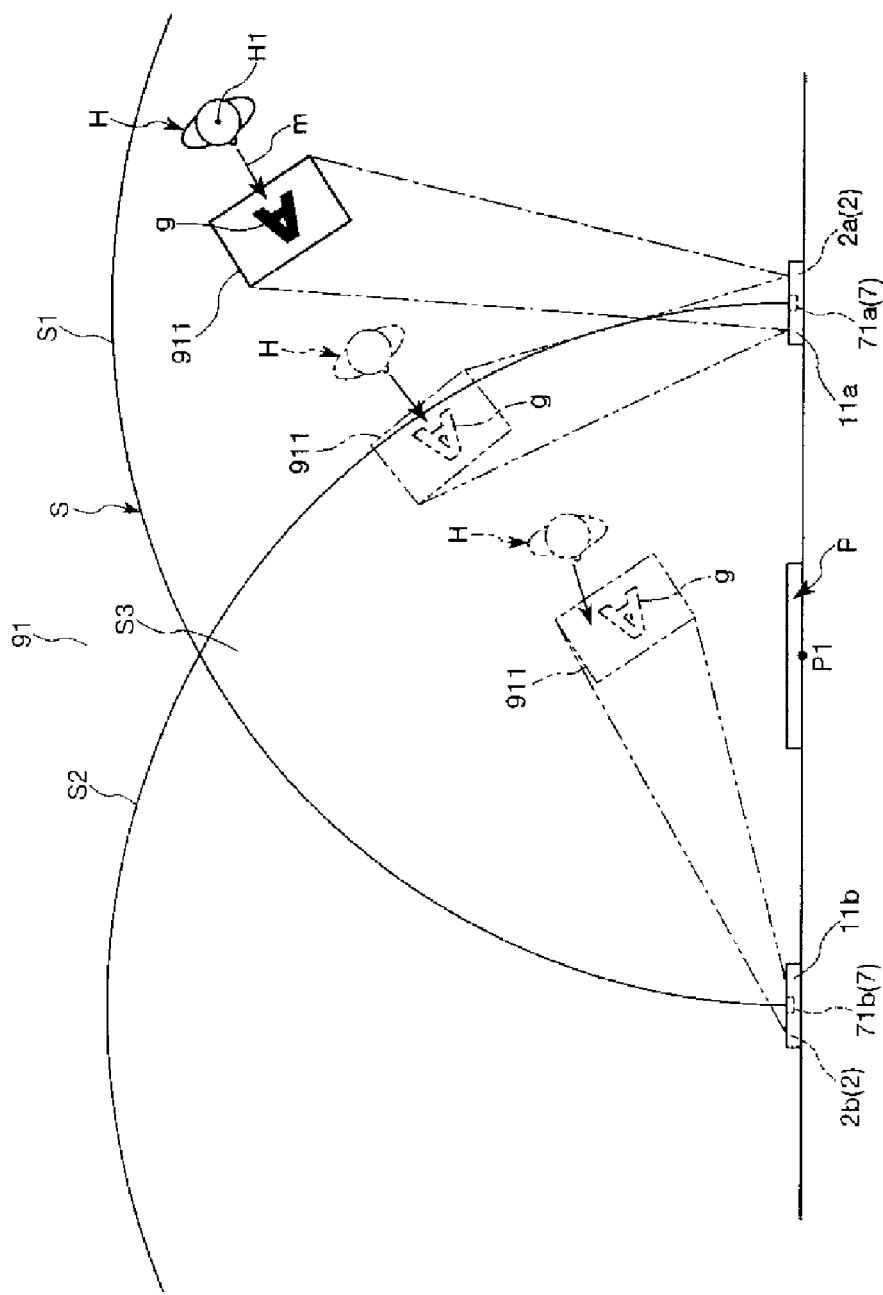
FIG. 14 is a top view for explaining the operation of the image forming apparatus shown in FIG. 1.
Figure 15:
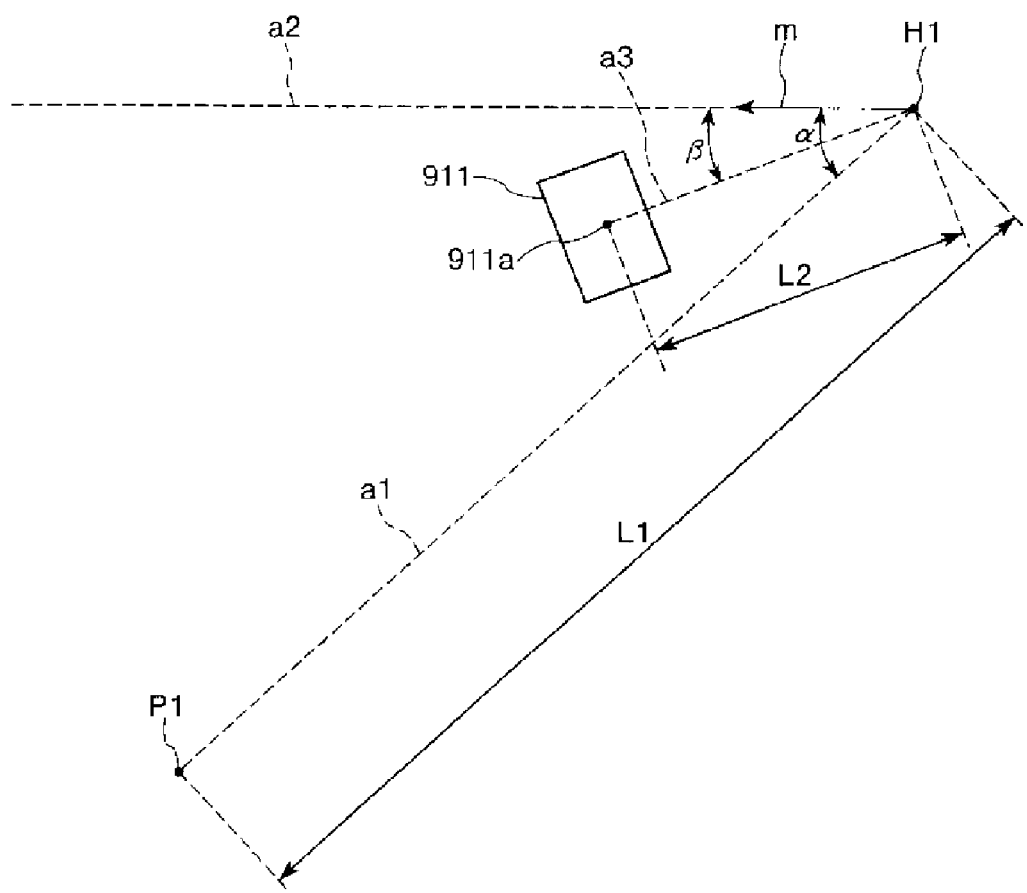
FIG. 15 is a diagram for explaining the position of a rendering region shown in FIG. 14.
Figure 16:
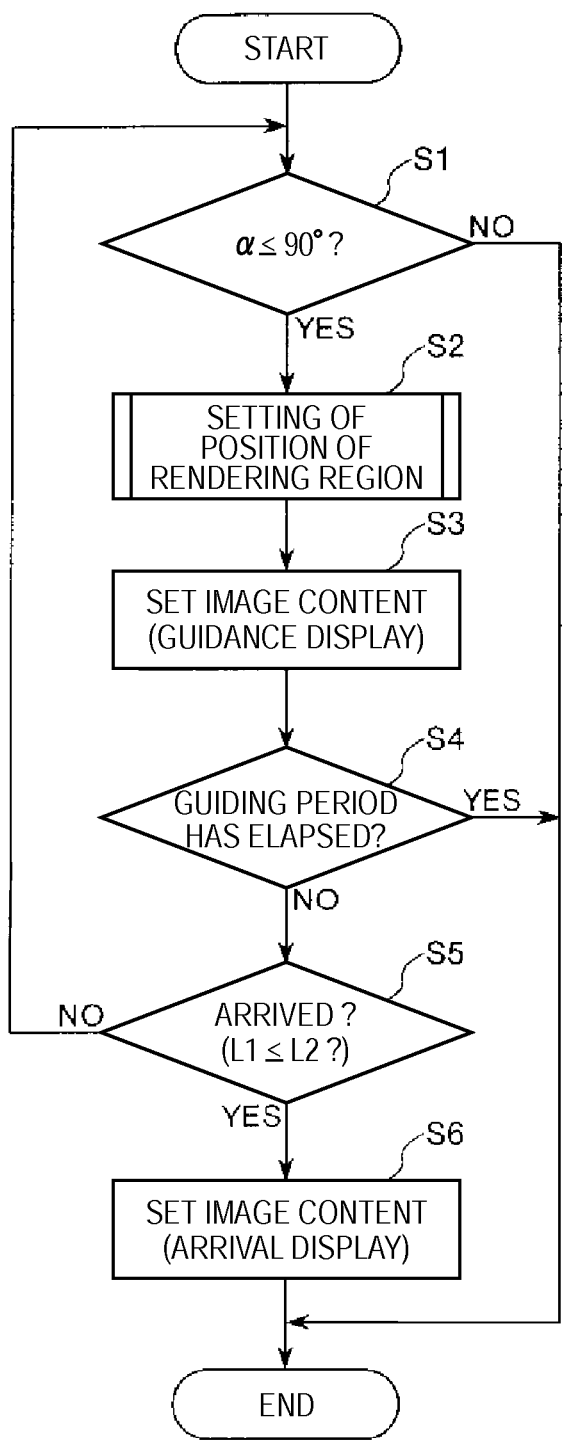
FIG. 16 is a flowchart for explaining control of the projector shown in FIG. 14 (changes of the position of the rendering region and the content of an image).
Figure 17:
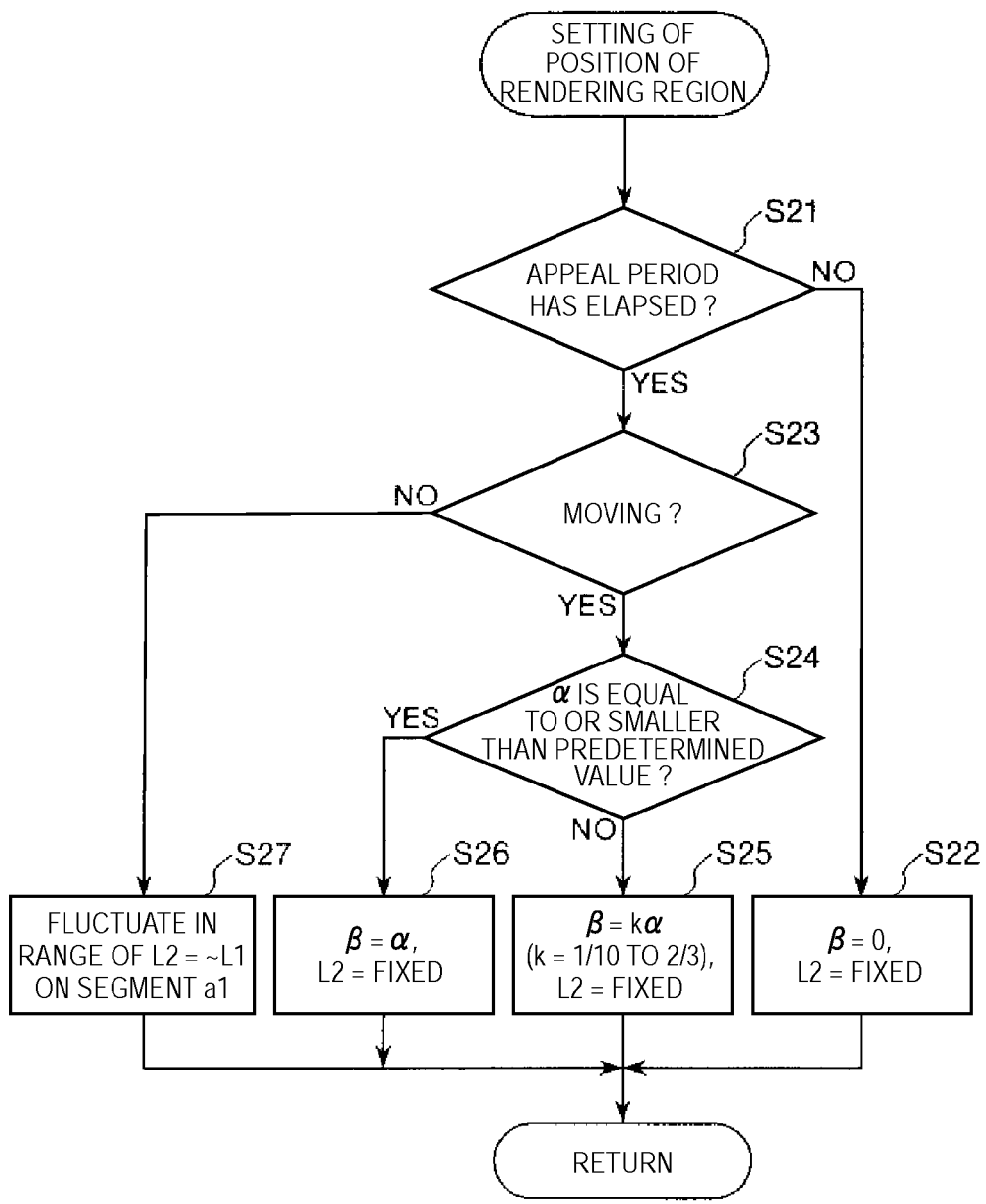
FIG. 17 is a flowchart for explaining setting of the position of the rendering region shown in FIG. 16.
Figure 18:
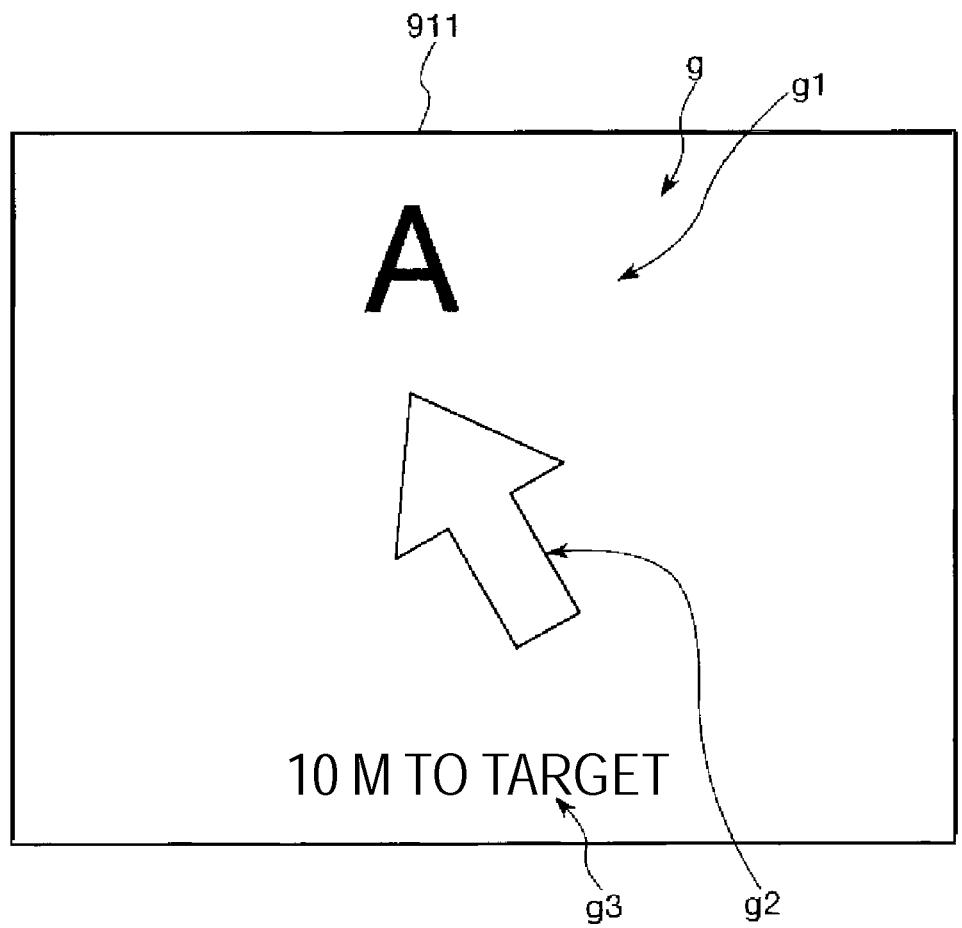
FIG. 18 is a diagram showing an example of an image displayed in the rendering region shown in FIG. 14.

FIG. 1 is a diagram showing an image forming apparatus according to a first embodiment of the invention. FIG. 2 is a block diagram showing a schematic configuration of the image forming apparatus shown in FIG. 1. FIG. 3 is a diagram showing a schematic configuration of a projector included in the image forming apparatus shown in FIG. 2. FIG. 4 is a partial sectional perspective view of an optical scanner included in the projector shown in FIG. 3. FIGS. 5A and 5B are sectional views for explaining the operation of the optical scanner shown in FIG. 4. FIG. 6 is a block diagram showing a control system (an actuation control unit, a light scanning unit, and a light source unit) of the projector shown in FIG. 3. FIG. 7A is a side view for explaining the operation of the projector shown in FIG. 3. FIG. 7B is a front view for explaining the operation of the projector shown in FIG. 3. FIG. 8 is a graph showing transition of a deflecting angle (a change with time of the deflecting angle) of a movable plate of an optical scanner (an optical scanner for horizontal scanning) during actuation of the projector shown in FIG. 3. FIG. 9 is a graph showing transition of a deflecting angle (a change with time of the deflecting angle) of a movable plate of an optical scanner (an optical scanner for vertical scanning) during actuation of the projector shown in FIG. 3. FIG. 10A is a side view showing a modification of the operation of the projector shown in FIG. 3. FIG. 10B is a front view of the modification of the operation of the projector shown in FIG. 3. FIG. 11 is a partial sectional side view showing the projector and a supporting section pivoting unit included in the image forming apparatus shown in FIG. 2. FIGS. 12A and 12B are top views for explaining the action of the supporting section pivoting unit shown in FIG. 11. FIG. 13 is a perspective view showing a scanner pivoting unit included in the light scanning unit of the projector shown in FIG. 11. FIG. 14 is a top view for explaining the operation of the image forming apparatus shown in FIG. 1. FIG. 15 is a diagram for explaining the position of a rendering region shown in FIG. 14. FIG. 16 is a flowchart for explaining control of the projector shown in FIG. 14 (changes of the position of the rendering region and the content of an image). FIG. 17 is a flowchart for explaining setting of the position of the rendering region shown in FIG. 16. FIG. 18 is a diagram showing an example of an image displayed in the rendering region shown in FIG. 14. For convenience of explanation, an upper side, a lower side, a right side, and a left side in FIGS. 4, 5A and 5B, 7A and 7B, and 10A and 10B are hereinafter respectively referred to as "upper", "lower", "right", and "left".

An image forming apparatus 1 shown in FIG. 1 is an apparatus that displays a predetermined image g such as a still image or a moving image (in particular, a commercial video or a promotion video) on a display surface 91 set on a floor surface of a floor 9 in a structure such as a building.

In particular, the display surface 91 is set around a guiding point P1 to which a person H should be guided. The image forming apparatus 1 changes, according to a moving state of the person H moving on the floor 9, the position of a rendering region 911, which is a region where the image g is displayed, to guide the person H to the guiding point P1. For example, as shown in FIG. 1, the image forming apparatus 1 performs movement $M_G$ of the rendering region 911 while maintaining a state in which the rendering region 911 is located in a predetermined position on a front side of the person H such that movement $M_H$ of the person H is performed toward the guiding point P1.

Therefore, even if the person H is moving, the image forming apparatus 1 can display the image g in a position where the person H can easily see the image g. Therefore, for example, when an image for advertisement such as a commercial video or a promotion video is used as a display image, the image forming apparatus 1 can show an excellent advertisement function.

For example, the image forming apparatus 1 can display, to the person H, the image in a position and with content for urging guidance to the guiding point P1 to guide the person H as a target to the guiding point P1. Therefore, the image forming apparatus 1 can guide the target person H to a desired point (the guiding point P1).

In this embodiment, the guiding point P1 is set in, for example, an entrance P of a store in a shopping mall. Consequently, the image forming apparatus 1 can attract customers by guiding the person H to the store. A setting position of the guiding point P1 is not limited to this and may be, for example, various entrances, various exits, an evacuation region, or the like.

The display surface 91 as a target of display of the image g may be the floor surface itself of the floor 9 or may be the surface of a screen laid on the floor surface of the floor 9. When the surface of the screen laid on the floor surface of the floor 9 is used as the display surface 91, the display surface 91 can be given an optical characteristic suitable for display of the image g. Therefore, it is possible to improve visibility of the image regardless of, for example, a material of a place (in this embodiment, the floor) where the image is displayed. A material of such a screen is not specifically limited. Examples of the material include polyethylene, polypropylene, polyvinyl chloride, polystyrene, polyamide, acrylic resin, ABS resin, fluorine resin, epoxy resin, or silicone resin or copolymer, a blended body, or a polymer alloy containing any one of these materials as a main component. One of these materials can be used or two or more of these materials can be used in combination.

As shown in FIG. 2, the image forming apparatus 1 includes two projectors 2 (2a and 2b) that scan light on the display surface 91 and display (render) an image, a detecting unit 7 that detects the presence or absence of a person near the display surface 91 and a moving state of the person, and a control unit 8 that controls driving of the projectors 2 on the basis of a detection result of the detecting unit 7. The image forming apparatus 1 includes two housings 11 (11a and 11b). The projector 2a is housed in one housing 11a and the projector 2b is housed in the other housing 11b.

Such an image forming apparatus 1 displays an image using the projectors 2 of a light scanning type. Therefore, compared with an image forming apparatus including a flat panel display such as an LED panel, a liquid crystal panel, or an organic EL panel, the image forming apparatus 1 is inexpensive and is easily set.

The units included in the image forming apparatus 1 are explained in detail below in order.

Projector

First, the projector 2 is explained. The projector 2a (2) and the projector 2b (2) have the same configuration.

The projector 2 is configured to be capable of scanning light on the rendering region 911 formed on the display surface 91 to thereby display the image g and changing the position of the rendering region 911 and the content of the image g.

Specifically, as shown in FIG. 3, the projector 2 includes a light source unit (a light emitting unit) 3 that emits light, a light scanning unit 4 that scans the light, which is emitting from the light source unit 3, on the display surface 91, a distortion correcting unit (an actuation control device) 5 that corrects distortion of an image displayed on the display surface 91, and a rendering-position changing unit 6 that changes the position of the rendering region 911.

Light Source Unit (Light Emitting Unit)

As shown in FIG. 3, the light source unit 3 includes laser beam sources 31r, 31g, and 31b for respective colors and collimator lenses 32r, 32g, and 32b and dichroic mirrors 33r, 33g, and 33b provided to correspond to the laser beam sources 31r, 31g, and 31b for the respective colors.

The laser beam sources 31r, 31g, and 31b for the respective colors respectively include driving circuits 310r, 310g, and 310b and a light source 320r for red, a light source 320g for green, and a light source 320b for blue (see FIG. 6). As shown in FIG. 3, the laser beam sources 31r, 31g, and 31b respectively emit laser beams RR, GG, and BB of red, green, and blue. The laser beams RR, GG, and BB are emitted while being modulated to respectively correspond to driving signals transmitted from a light-source modulating section 54 explained later of the distortion correcting unit 5. The laser beams RR, GG, and BB are parallelized and changed to narrow beams by the collimator lenses 32r, 32g, and 32b, which are collimate optical elements.

The dichroic mirrors 33r, 33g, and 33b respectively have characteristics for reflecting the red laser beam RR, the green laser beam GG, and the blue laser beam BB. The dichroic mirrors 33r, 33g, and 33b combine the laser beams RR, GG, and BB of the respective colors and emit one laser beam (light) LL.

Collimator mirrors can be used instead of the collimator lenses 32r, 32g, and 32b. In this case, as in the case of the collimator lenses 32r, 32g, and 32b, narrow beams of parallel light beams can be formed. When the parallel light beams are emitted from the laser beam sources 31r, 31g and 31b for the respective colors, the collimator lenses 32r, 32g, and 32b can be omitted. The laser beam sources 31r, 31g, and 31b can be replaced with light sources such as light emitting diodes that generate the same light beams. The order of the laser beam sources 31r, 31g, and 31b, the collimator lenses 32r, 32g, and 32b, and the dichroic mirrors 33r, 33g, and 33b for the respective colors shown in FIG. 3 is only an example. It is possible to freely change the order while keeping the combination of the colors (the laser beam source 31r, the collimator lens 32r, and the dichroic mirror 33r are for red, the laser beam source 31g, the collimator lens 32g, and the dichroic mirror 33g are for green, and the laser beam source 31b, the collimator lens 32b, and the dichroic mirror 33b are for blue). For example, a combination of blue, red, and green is also possible in order from the color closest to the light scanning unit 4.

Light Scanning Unit

The light scanning unit 4 is explained below.

The light scanning unit 4 scans the laser beam LL, which is emitted from the light source unit 3, on the display surface 91.

The light scanning unit 4 scans the laser beam LL in the horizontal direction (a first direction) (horizontal scanning: main scanning) and scans the laser beam LL in the vertical direction (a second direction orthogonal to the first direction) at scanning speed lower than scanning speed in the horizontal direction (vertical scanning: sub-scanning) to two-dimensionally scan the laser beam LL.

The light scanning unit 4 includes an optical scanner (a first direction scanning section) 41 as a mirror for horizontal scanning that scans the laser beam LL, which is emitted from the light source unit 3, on the display surface 91 in the horizontal direction, an angle detecting unit (a behavior detecting unit) 43 that detects the angle (behavior) of a movable plate 411a explained later of the optical scanner 41, an optical scanner (a second direction scanning section) 42 as a mirror for vertical scanning that scans the laser beam LL, which is emitted from the light source unit 3, on the display surface 91 in the vertical direction, and an angle detecting unit (a behavior detecting unit) 44 that detects the angle (behavior) of a movable plate 421a explained later of the optical scanner 42.

The configuration of the optical scanners 41 and 42 is explained below. Since the optical scanners 41 and 42 have the same configuration, the optical scanner 41 is representatively explained below and explanation of the optical scanner 42 is omitted.

As shown in FIG. 4, the optical scanner 41 is an optical scanner of a so-called single-degree-of-freedom oscillation system (one-dimensional scanning). The optical scanner 41 includes a substrate 411, an opposed substrate 413 provided to be opposed to the lower surface of the substrate 411, and a spacer member 412 provided between the substrate 411 and the opposed substrate 413.

The substrate 411 includes the movable plate 411a, a supporting section 411b that pivotably supports the movable plate 411a, and a pair of coupling sections 411c and 411d that couple the movable plate 411a and the supporting section 411b.

The movable plate 411a is formed in a substantially rectangular shape in plan view thereof. A light reflecting section (a mirror) 411e having light reflectivity is provided on the upper surface of such a movable plate 411a. The front surface (the upper surface) of the light reflecting section 411e configures a reflection surface that reflects light. The light reflecting section 411e is made of a metal film of, for example, Al or Ni. A permanent magnet 414 is provided on the lower surface of the movable plate 411a.

The supporting section 411b is provided to surround the outer periphery of the movable plate 411a in plan view of the movable plate 411a. Specifically, the supporting section 411b is formed in a frame shape and the movable plate 411a is located on the inner side of the supporting section 411b.

The coupling section 411c couples the movable plate 411a and the supporting section 411b on the left side of the movable plate 411a. The coupling section 411d couples the movable plate 411a and the supporting section 411b on the right side of the movable plate 411a.

Each of the coupling sections 411c and 411d is formed in a longitudinal shape. Each of the coupling sections 411c and 411d is elastically deformable. Such a pair of coupling sections 411c and 411d are provided coaxially with each other. The movable plate 411a pivots with respect to the supporting section 411b around this axis (hereinafter referred to as "pivoting center axis J1").

Such a substrate 411 is formed of, for example, silicon as a main material. The movable plate 411a, the supporting section 411b, and the coupling sections 411c and 411d are integrally formed. Since the substrate 411 is formed of silicon as the main material in this way, it is possible to realize an excellent pivoting characteristic and show excellent durability. Since fine processing of silicon is possible, it is possible to give excellent dimensional accuracy to the substrate 411 and give an excellent oscillation characteristic to the optical scanner 41 by forming the substrate 411 with silicon as the main material. It is also possible to realize a reduction in size of the optical scanner 41.

The spacer member 412 is formed in a frame shape. The upper surface of the spacer member 412 is joined to the lower surface of the substrate 411. The spacer member 412 is substantially equal to the shape of the supporting section 411b in plan view of the movable plate 411a. Such a spacer member 412 is formed of, for example, any one of various kinds of glass, any one of various kinds of ceramic, silicon, or $SiO_2$.

A method of joining the spacer member 412 and the substrate 411 is not specifically limited. For example, the spacer member 412 and the substrate 411 may be joined via another member such as an adhesive. Depending on a material of the spacer member 412, direct joining, anode joining, or the like may be used.

Like the spacer member 412, the opposed substrate 413 is formed of, for example, any one of various kinds of glass, silicon, or $SiO_2$. A coil 415 is provided in a region on the upper surface of such an opposed substrate 413 and opposed to the movable plate 411a.

The permanent magnet 414 is formed in a plate bar shape and provided along the lower surface of the movable plate 411a. Such a permanent magnet 414 is magnetized (polarized) in a direction orthogonal to the pivoting center axis J1 in plan view of the movable plate 411a. Specifically, the permanent magnet 414 is provided such that a segment connecting both the poles (the S pole and the N pole) is orthogonal to the pivoting center axis J1.

Such a permanent magnet 414 is not specifically limited. For example, a neodium magnet, a ferrite magnet, a samarium cobalt magnet, or an alnico magnet can be used.

The coil 415 is provided to surround the outer periphery of the permanent magnet 414 in plan view of the movable plate 411a.

The optical scanner 41 includes a voltage applying unit 416 that applies voltage to the coil 415. The voltage applying unit 416 is configured to be capable of adjusting (changing) conditions such as a voltage value and a frequency of voltage to be applied. The voltage applying unit 416, the coil 415, and the permanent magnet 414 configure a driving unit 417 that pivots the movable plate 411a.

A predetermined voltage is applied to the coil 415 from the voltage applying unit 416. A predetermined electric current flows to the coil 415.

For example, when an alternating voltage is applied to the coil 415 from the voltage applying unit 416, an electric current flows according the application of the alternating voltage, a magnetic field in the thickness direction of the movable plate 411a (the up to down direction in FIG. 4) is generated, and the direction of the magnetic field is periodically switched. Specifically, a state A in which the vicinity of the upper side of the coil 415 is the S pole and the vicinity of the lower side of the coil 415 is the N pole and a state B in which the vicinity of the upper side of the coil 415 is the N pole and the vicinity of the lower side of the coil 415 is the S pole are alternately switched. In this case, the voltage applying unit 416 is controlled to be driven by the distortion correcting unit 5 explained later.

In the state A, as shown in FIG. 5A, a portion on the right side of the permanent magnet 414 is displaced to the upper side by repulsion against a magnetic field generated by energization to the coil 415 and a portion on the left side of the permanent magnet 414 is displaced to the lower side by attraction to the magnetic field. Consequently, the movable plate 411a pivots counterclockwise and tilts.

On the other hand, in the state B, as shown in FIG. 5B, the portion on the right side of the permanent magnet 414 is displaced to the lower side and the portion on the left side of the permanent magnet 414 is displaced to the upper side. Consequently, the movable plate 411a pivots clockwise and tilts.

Such states A and B are alternately repeated, whereby the movable plate 411a pivots (oscillates) around the pivoting center axis J1 while torsionally deforming the coupling sections 411c and 411d.

The flowing electric current can be adjusted by adjusting the voltage applied to the coil 415 from the voltage applying unit 416 according to the control of the distortion correcting unit 5 explained later. This makes it possible to adjust a deflecting angle (amplitude) of the pivoting around the pivoting center axis J1 of the movable plate 411a (the reflection surface of the light reflecting section 411e).

The configuration of such an optical scanner 41 is not specifically limited as long as the movable plate 411a can be pivoted. For example, the optical scanner 41 may be an optical scanner including a two-degree-of-freedom oscillation system. A driving system for the optical scanner 41 may be, for example, piezoelectric driving by a piezoelectric element or electrostatic driving by electrostatic attraction instead of electromagnetic driving by the coil 415 and the permanent magnet 414.

As shown in FIG. 3, the optical scanners 41 and 42 having the configuration explained above are provided such that the pivoting center axes J1 and J2 thereof are orthogonal to each other. By providing the optical scanners 41 and 42 in this way, it is possible to scan the laser beam LL, which is emitted from the light source unit 3, on the display surface 91 two-dimensionally (in two directions orthogonal to each other). This makes it possible to render a two-dimensional image on the display surface 91 with a relatively simple configuration.

Specifically, light emitted from the light source unit 3 is reflected on the reflection surface of the light reflecting section 411e of the optical scanner 41. Subsequently, the light is reflected on a reflection surface of the light reflecting section 421e of the optical scanner 42 and projected (irradiated) on the display surface 91. At this point, the light reflecting section 411e of the optical scanner 41 is pivoted and the light reflecting section 421e of the optical scanner 42 is pivoted at angular velocity lower than angular velocity (speed) of the light reflecting section 411e. Consequently, the laser beam LL emitted from the light source unit 3 is scanned on the display surface 91 in the horizontal direction and scanned in the vertical direction at scanning speed lower than scanning speed in the horizontal direction. In this way, the laser beam LL emitted from the light source unit 3 is two-dimensionally scanned on the display surface 91 and an image is rendered on the display surface 91.

In order to pivot the light reflecting section 421e of the optical scanner 42 at angular velocity lower than the angular velocity of the light reflecting section 411e of the optical scanner 41, for example, the optical scanner 41 may be resonantly driven using resonance and the optical scanner 42 may be non-resonantly driven without using resonance. When both the optical scanners 41 and 42 are resonantly driven, the optical scanners 41 and 42 only have to be designed such that the resonant frequency of the optical scanner 41 (the resonant frequency of an oscillation system including the movable plate 411a and the coupling sections 411c and 411d) is higher than the resonant frequency of the optical scanner 42.

The light emitted from the light source unit 3 may be reflected on the light reflecting section 421e of the optical scanner 42 first and then reflected on the light reflecting section 411e of the optical scanner 41. In other words, the light scanning unit 4 may be configured to perform the vertical scanner first and then perform the horizontal scanning.

The angle detecting unit 43 that detects the angle of the movable plate 411a of the optical scanner 41 is explained below. The angle detecting unit 44 that detects the angle of the movable plate 421a of the optical scanner 42 has a configuration same as that of the angle detecting unit 43. Therefore, explanation of the angle detecting unit 44 is omitted.

As shown in FIG. 4, the angle detecting unit 43 includes a piezoelectric element 431 provided on the coupling section 411c of the optical scanner 41, an electromotive-force detecting section 432 that detects electromotive force generated from the piezoelectric element 431, and an angle detecting section 433 that calculates an angle (detects behavior) of the movable plate 411a on the basis of a detection result of the electromotive-force detecting section 432.

When the coupling section 411c is torsionally deformed according to the pivoting of the movable plate 411a, the piezoelectric element 431 is deformed according to the torsional deformation. The piezoelectric element 431 has a characteristic that, when the piezoelectric element 431 is deformed from a natural state in which external force is not applied, the piezoelectric element 431 generates electromotive force of magnitude corresponding to an amount of the deformation. Therefore, the angle detecting section 433 calculates a degree of the torsion of the coupling section 411c on the basis of the magnitude of the electromotive force detected by the electromotive-force detecting section 432 and further calculates the angle of the movable plate 411a (the reflection surface of the light reflecting section 411e) from the degree of the torsion. Further, the angle detecting section 433 calculates a deflecting angle around the pivoting center axis J1 of the movable plate 411a. A signal including information concerning the angle and the deflecting angle of the movable plate 411a is transmitted from the angle detecting section 433 to the distortion correcting unit 5.

A reference (0°) of the detected angle of the movable plate 411a can be set in any state of the optical scanner 41. The reference can be set, for example, when the optical scanner 41 is in an initial state (a state in which voltage is not applied to the coil 415).

The detection of the angle of the movable plate 411a may be performed on a real time basis (continuously) or may be intermittently performed. The angle detecting unit 43 is not limited to an angle detecting unit including a piezoelectric element as in this embodiment as long as the angle detecting unit can detect the angle of the movable plate 411a. For example, an optical sensor may be used.

Distortion Correcting Unit

The distortion correcting unit 5 is explained below.

In the projector 2, when an image is displayed (rendered) on the display surface 91 using the pair of optical scanners 41 and 42 explained above, distortion due to an optical path difference to the display surface 91 occurs. For example, lengths in the lateral direction (the horizontal direction) are different on the upper side and the lower side of an image displayed on the display surface 91, i.e., distortion called "keystone distortion" occurs.

In particular, when the position of the rendering region 911 is changed as explained later, at least one of the postures (the directions), the shapes, and the areas (the dimensions) of the image g displayed on the display surface 91 and the rendering region 911 are distorted.

The distortion correcting unit 5 has a function of correcting such distortion of the image g and the rendering region 911.

This makes it possible to display an image with the distortion corrected on the display surface 91. Therefore, it is possible to display an image having desired content that a person can easily recognize.

The distortion correcting unit 5 is explained in detail.

As shown in FIG. 6, the distortion correcting unit 5 includes a video-data storing section (a video-data storing unit) 51 that stores video data (image data) used in rendering an image, a video-data calculating section 52, a rendering-timing generating section 53, a light-source modulating section (a light modulating unit) 54, a deflecting-angle calculating section (an amplitude calculating section) 55, an angle indicating section 56, and an analytical-curve storing section (an analytical-curve storing unit) 57 that stores an analytical curve.

The projector 2 performs scanning in the vertical direction (hereinafter also simply referred to as "vertical scanning") in each of a forward path and a backward path and performs, in each of the forward path and the backward path of the vertical scanning, scanning in the horizontal direction (hereinafter also simply referred to as "horizontal scanning") in each of the forward path and the backward path to thereby display (render) an image on the display surface 91.

The projector 2 is configured to adjust, in performing the horizontal scanning, the deflecting angle of the movable plate 411a such that amplitude in the horizontal direction of the laser beam LL (hereinafter also simply referred to as "amplitude of the laser beam (light) LL") on the display surface 91 is aligned along the vertical direction in a light emission state in which the laser beam LL is emitted from the light source unit 3 (hereinafter also simply referred to as "light emission state") compared with not performing adjustment (adjustment by an adjusting unit) of the deflecting angle around the pivoting center axis J1 of the movable plate 411a (hereinafter also simply referred to as "deflecting angle of the movable plate 411a"). In particular, the projector 2 is desirably configured to adjust the deflecting angle of the movable plate 411a to fix the amplitude of the laser beam LL along the vertical direction in the light emission state. This makes it possible to prevent keystone distortion of an image while increasing a time aperture ratio. In this embodiment, the adjustment to fix the amplitude along the vertical direction is representatively explained.

The amplitude (a scanning range) is a distance (an interval) in the horizontal direction between the position of the laser beam LL on the same plane as the display surface 91 at the time when the movable plate 411a pivots to a maximum angle clockwise (in a predetermined direction) in the light emission state and the position of the laser beam LL on the same plane as the display surface 91 at the time when the movable plate 411a subsequently pivots to the maximum angle counterclockwise (in the opposite direction of the predetermined direction). In other words, as shown in FIGS. 7A and 7B, the amplitude is length in the horizontal direction of each of plural rendering lines (scanning lines) L that are tracks of the laser beam LL on the display surface 91 at the time when the laser beam LL is two-dimensionally scanned on the display surface 91 in the light emission state.

As shown in FIGS. 7A and 7B, the plural rendering lines L are arranged in a zigzag. Each of left side ends and right side ends of the rendering lines L is not suitable for rendering because the angular velocity (speed) of the light reflecting section 411e of the optical scanner 41 is small. Therefore, the rendering region (the display region) 911 as a region where an image is rendered (displayed) is set excluding the left side ends and the right side ends. For example, the rendering region 911 is set to be formed in a rectangular shape (including a square). In FIGS. 7A and 7B, for convenience of explanation, the rendering region 911 is schematically shown. In FIGS. 7A and 7B, for convenience of explanation, the rendering region 911 generally coincides with a region that can be scanned by the rendering line L. However, as explained later, depending on the position of the rendering region 911, the moving direction of the target person H, or the like, the posture (the direction), the size, the shape, and the like of the rendering region 911 are different from the posture (the direction), the size, the shape, and the like of the region that can be scanned by the rendering line L. In other words, the rendering region 911 can be set in an arbitrary region in the region that can be scanned by the rendering line L. The posture (the direction), the size, the shape, and the like of the rendering region 911 change according to the position of the rendering region 911, the moving direction of the target person H, or the like.

When the deflecting angle of the movable plate 411a of the optical scanner 41 is fixed, the amplitude of the laser beam LL in the light emission state changes according to the angle of the movable plate 421a of the optical scanner 42. The amplitude of the laser beam LL is longer as a position in the vertical direction on the display surface 91 on which the laser beam LL is scanned (the position in the vertical direction of the rendering line L) is farther away from the projector 2. Therefore, in the projector 2, the deflecting angle of the movable plate 411a is adjusted according to the angle of the movable plate 421a. Specifically, the amplitude of the laser beam LL in the light emission state is fixed along the vertical direction by setting the deflecting angle of the movable plate 411a smaller as the position in the vertical direction on the display surface 91 on which the laser beam LL (the position in the vertical direction of the rendering line L) is farther away from the projector 2.

In the analytical-curve storing section 57, analytical curves of a table, an arithmetic expression (a function), and the like indicating a relation between the position in the vertical direction on the display surface 91 of the laser beam LL scanned on the display surface 91 (the position in the vertical direction of the rendering line L) where the amplitude of the laser beam LL is fixed along the vertical direction in the light emission state and the deflecting angle of the movable plate 411a are stored. When an image is rendered, a target value of the deflecting angle (a target deflecting angle) is calculated using the analytical curves on the basis of the position in the vertical direction on the display surface 91 of the laser beam LL scanned on the display surface 91. The analytical curves can be obtained by calculation and stored in the analytical-curve storing section 57 in advance.

In the projector 2, the angle and the angular velocity of the movable plate 421a are desirably adjusted to fix an interval in the vertical direction between the rendering lines L adjacent to each other concerning the odd-number-th rendering lines L from the upper side and fix an interval in the vertical direction between the rendering lines L adjacent to each other concerning the even-number-th rendering lines L from the upper side in the rendering region 911. This makes it possible to prevent distortion in the vertical direction of an image.

In this embodiment, for example, at each of the left side end and the right side end of the rendering region 911 at the start of rendering of the rendering lines L, the angle of the movable plate 421a is adjusted to fix the interval in the vertical direction between the rendering lines L adjacent to each other and the angular velocity of the movable plate 421a is set to a predetermined value. Specifically, concerning the rendering lines L, the angle of the movable plate 421a is adjusted to fix an interval in the vertical direction between rendering starting points adjacent to each other and the angular velocity of the movable plate 421a is set to a fixed value for each of the rendering lines L. The angular velocity of the movable plate 421a is set smaller as the position in the vertical direction of the rendering line L is farther away from the projector 2. This makes it possible to prevent distortion in the vertical direction of an image with relatively simple control.

The operation (the action) of the projector 2 in rendering an image on the display surface 91 is explained below.

First, video data is input to the projector 2. The video data is determined by the control unit 8 explained later according to a detection result of the detecting unit 7. The input video data is temporarily stored in the video-data storing section 51. Rendering of an image is performed using the video data read out from the video-data storing section 51. In this case, the rendering of an image may be started after all the video data is stored in the video-data storing section 51. The rendering of an image may be started after a part of the video data is stored in the video-data storing section 51 and the following video data may be stored in the video-data storing section 51 in parallel to the rendering of the image.

When the rendering of an image is started after a part of the video data is stored in the video-data storing section 51, first, the video data for at least one frame, desirably, two or more frames (e.g., two frames) is stored in the video-data storing section 51 and, thereafter, the rendering of the image is started. A reason for this is as explained below. In the projector 2, the horizontal scanning is performed in each of the forward path and the backward path of the vertical scanning to render an image (hereinafter also simply referred to as "back-and-forth rendering in the vertical direction") and, as explained later, order of reading out video data from the video-data storing section 51 is reversed when an image is rendered in the forward path of the vertical scanning and when an image is rendered in the backward path of the vertical scanning. Therefore, when the rendering of the image is started in the backward path of the vertical scanning, in order to read out the video data from the opposite side, at least video data for one frame used for rendering of the image in the backward path needs to be stored in the video-data storing section 51.

The rendering-timing generating section 53 generates rendering timing information and rendering line information. The rendering-timing generating section 53 sends the rendering timing information to the video-data calculating section 52 and sends the rendering line information to the deflecting-angle calculating section 55.

The rendering timing information includes information concerning timing for performing rendering. The rendering line information includes information concerning the position in the vertical direction of the rendering line L for performing rendering (the angle of the movable plate 421a). The position of any region of the rendering line L may be set as the position in the vertical direction of the rendering line L. Examples of the position include the distal end on the left side, the distal end on the right side, and the center.

In particular, the rendering-timing generating section 53 generates rendering timing information corresponding to the position of the rendering region 911. For example, plural kinds of rendering timing information corresponding to each position of the rendering region 911 are set (stored) in advance in the rendering-timing generating section 53. The rendering-timing generating section 53 selects rendering timing information corresponding to the position of the rendering region 911 on the basis of the position of the rendering region 911 (a detection result of the detecting unit 7) and sends the rendering timing information. The rendering-timing generating section 53 includes a calculating section for calculating rendering timing information. The calculating section may calculate and generate rendering timing information on the basis of the position of the rendering region 911 (the detection result of the detecting unit 7).

The rendering timing information is set to adjust at least one of the posture, the shape, and the area of the rendering region 911 on the display surface 91. This makes it possible to set rendering timing for video data to desired timing for each pixel to be rendered and adjust at least one of the postures, the shapes, and the areas of the rendering region 911 and the image g on the display surface 91. Therefore, it is possible to correct distortion of the rendering region 911 and the image g on the display surface 91.

In this embodiment, the rendering timing information is set to fix the shapes and the areas (the dimensions) of the rendering region 911 and the image g. This makes it possible to allow a person to easily recognize the content of the image g displayed on the display surface 91 (the rendering region 911).

In this embodiment, the rendering timing information is set to fix the direction of the image g displayed on the display surface 91 with respect to the direction of the person H (the moving direction of the person H). This also makes it possible to allow a person to easily recognize the content of the image g displayed on the display surface 91 (the rendering region 911).

The video-data calculating section 52 calculates, on the basis of the rendering timing information and the rendering line information input from the rendering-timing generating section 53, information concerning the moving direction of the target person H obtained from the detecting unit 7, and pivoting angle information in a unit pivoting mechanism 61, order (addresses) for reading out video data from the video-data storing section 51 to allow the target person H to easily see the image g. The video-data calculating section 52 reads out, on the basis of a result of the calculation, video data corresponding to a pixel to be rendered from the video-data storing section 51 and, after performing various correction operations or the like, sends luminance data of the respective colors to the light-source modulating section 54.

The light-source modulating section 54 performs modulation of the light sources 320r, 320g, and 320b via the driving circuits 310r, 310g, and 310b on the basis of the luminance data of the respective colors input from the video-data calculating section 52. Specifically, the light-source modulating section 54 performs, for example, on and off of the light sources 320r, 320g, and 320b and adjustment (increase or decrease) of outputs.

The angle detecting unit 43 on the optical scanner 41 side detects the angle and the deflecting angle of the movable plate 411a and sends information concerning the angle and the deflecting angle (angle information of the movable plate 411a) to the rendering-timing generating section 53 and the deflecting-angle calculating section 55 of the distortion correcting unit 5. The angle detecting unit 44 on the optical scanner 42 side detects the angle of the movable plate 421a and sends information concerning the angle (angle information of the movable plate 421a) to the angle indicating section 56 of the distortion correcting unit 5.

When the present rendering of the rendering line L ends and information concerning the deflecting angle of the movable plate 411a is input from the angle detecting unit 43, in synchronization with the input of the information, the rendering-timing generating section 53 sends, to the angle indicating section 56, target angle information (angle indication) indicating a target angle of the movable plate 421a at the time when the laser beam LL is irradiated on a rendering start point of the rendering line L for performing rendering next. The target angle of the movable plate 421a is set to fix an interval in the vertical direction between rendering starting points adjacent to each other. The angle indicating section 56 compares the angle of the movable plate 421a detected by the angle detecting unit 44 and the target angle of the movable plate 421a, performs correction for reducing a difference between the angle and the target angle to zero, and sends driving data to a driving unit 427 of the optical scanner 42.

The driving unit 427 drives the optical scanner 42 on the basis of the driving data (applies voltage to the coil). Consequently, when the laser beam LL is irradiated on the rendering start point, the angle of the movable plate 421a reaches the target angle.

In this embodiment, in each of the rendering lines L, the angular velocity of the movable plate 421a may be fixed and the scanning speed in the vertical direction of the laser beam LL may be fixed from a rendering start point to a rendering end point. The angular velocity of the movable plate 421a may be gradually changed and the scanning speed in the vertical direction of the laser beam LL may be gradually changed.

The rendering-timing generating section 53 sends the rendering line information, i.e., information concerning the position in the vertical direction of the rendering line L for performing rendering next to the deflecting-angle calculating section 55.

The deflecting-angle calculating section 55 calculates a target deflecting angle of the movable plate 411a in the rendering line L for performing rendering next using an analytical curve read out from the analytical-curve storing section 57 on the basis of the information concerning the position in the vertical direction of the rendering line L for performing rendering next input from the rendering-timing generating section 53. The deflecting-angle calculating section 55 sends driving data to the driving unit 417 of the optical scanner 41 on the basis of the information concerning the deflecting angle of the movable plate 411a input from the angle detecting unit 43 and the target deflecting angle of the movable plate 411a such that the deflecting angle of the movable plate 411a reaches the target deflecting angle.

The driving unit 417 applies, on the basis of the driving data, an effective voltage of a frequency same as the resonant frequency of the optical scanner 41 and feeds an electric current to the coil 415, generates a predetermined magnetic field, and changes the magnitude of an effective current and a phase difference between the optical scanner 41 and a driving waveform to supply energy to the optical scanner 41 or deprive energy from the optical scanner 41. Consequently, the deflecting angle of the resonating movable plate 411a reaches the target deflecting angle. In this way, the driving unit 417 sequentially scans the laser beam LL on the rendering lines L in the rendering region 911 to render an image while adjusting the angle of the movable plate 411a to reach the target deflecting angle on the basis of the information (the detection result) of the deflecting angle of the movable plate 411a detected by the angle detecting unit 43 and the target deflecting angle (a target value).

The rendering-timing generating section 53 performs management concerning which of an odd number frame (an odd-number-th frame) and an even number frame (an even-number-th frame) a frame to be rendered is. The rendering-timing generating section 53 determines, according to the management, the pivoting direction (the moving direction) of the movable plate 421a and readout order of video data from the video-data storing section 51. Specifically, the rendering-timing generating section 53 sets the readout order of video data opposite when an image is rendered in the odd number frame (a forward path of scanning in the vertical direction) and when an image is rendered in the even number frame (a backward path of scanning in the vertical direction).

The laser beam LL is scanned on the same line of the display surface 91 in the odd number frame and the even number frame. The laser beam LL is scanned such that the rendering lines L of odd number frames and the rendering lines L of even number frames coincide with each other.

Specifically, for example, as shown in FIGS. 7A and 7B, concerning a first frame (an odd-number-th frame), rendering is started from the upper left and performed to the lower right in a zigzag. Concerning a second frame (an even-number-th frame), the pivoting direction of the movable plate 421a is set opposite to the pivoting direction explained above and rendering is performed from the lower right to the upper left opposite to the above. Thereafter, similarly, concerning odd-number-th frames, rendering is performed from the upper left to the lower right and, concerning even-number-th frames, rendering is performed from the lower right to the upper left.

In this embodiment, the forward path of scanning in the vertical direction is set as the odd number frame and the backward path of scanning in the vertical direction is set as the even number frame. However, the invention is not limited to this. The backward path of scanning in the vertical direction may be set as the odd number frame and the forward path of scanning in the vertical direction may be set as the even number frame.

In this embodiment, the position for starting rendering concerning the first frame is the upper left. However, the invention is not limited to this. The position may be, for example, the upper right, the lower left, the lower right, and the like.

The laser beam LL may be scanned on different lines of the display surface 91 in the odd number frame and the even number frame.

A change with time of the deflecting angle of the movable plate 411a and a change with time of the deflecting angle of the movable plate 421a in the rendering of the image are as explained below.

In the horizontal scanning, as shown in FIG. 8, the deflecting angle of the movable plate 411a gradually increases from a minimum deflecting angle, after reaching a maximum deflecting angle, gradually decreases, and, after reaching the minimum deflecting angle, gradually increases again. Thereafter, the operation is repeated in the same manner. In this way, in the projector 2, since the deflecting angle of the movable plate 411a does not suddenly change, it is possible to easily and surely adjust the deflecting angle of the movable plate 411a of the optical scanner 41 that is actuated using resonance.

In the vertical scanning, as shown in FIG. 9, the deflecting angle of the movable plate 421a gradually increases from the minimum deflecting angle, after reaching the maximum deflecting angle, gradually decreases, and, after reaching the minimum deflecting angle, gradually increases again. Thereafter, the operation is repeated in the same manner. In this way, in the projector 2, since the deflecting angle of the movable plate 421a does not suddenly change, it is possible to easily and surely adjust the deflecting angle of the movable plate 421a of the optical scanner 42. A non-display period (a non-rendering period) in which rendering of an image is not performed is provided between a display period (a rendering period) in which rendering of an image is performed in the odd number frame (the forward path of scanning in the vertical direction) and a display period in which rendering of an image is performed in the even number frame (the backward path of scanning in the vertical direction). In the non-display period, it is possible to adjust timings such as timing for starting rendering of the next frame.

The rendering of an image is performed both in the forward path and the backward path of scanning in the vertical direction, i.e., when the movable plate 421a is pivoted in a predetermined direction and when the movable plate 421a is pivoted in the opposite direction of the predetermined direction. Therefore, a vertical blanking period in the past is unnecessary and the non-display period can be reduced. This makes it possible to increase a time aperture ratio (a ratio of a period in which rendering of an image is performed).

Specifically, it is possible to reduce the non-display period in the vertical direction in one frame by performing back-and-forth rendering. Consequently, a vertical time aperture ratio increases. When the angular velocity (speed) of the movable plate 411a is the same as that in performing horizontal scanning only in the forward path of the vertical scanning to render an image, compared with rendering an image only in the forward path, it is possible to increase the number of frames per unit time. This makes it possible to easily cope with quick movement in a moving image. In other words, when the number of frames per unit time is the same as that in performing the horizontal scanning only in the forward path of the vertical scanning to render an image, compared with rendering an image only in the forward path, it is possible to reduce the angular velocity of the movable plate 411a. This makes it possible to stably render an image. In the case explained above, when the angular velocity of the movable plate 411a is not changed, it is possible to perform rendering with higher vertical resolution.

Actually, in some case, for example, inertia (inertia moment) of the movable plates 411a and 421a of the optical scanners 41 and 42 is large and the movable plates 411a and 421a do not instantaneously follow a change in the deflecting angle. In such a case, for example, a driving current for the optical scanners 41 and 42 is set to zero or the optical scanners 41 and 42 are driven in an anti-phase (braking).

With the distortion correcting unit 5 explained above, it is possible to prevent keystone distortion of an image while increasing a time aperture ratio and without suddenly changing the deflecting angles of the movable plates 411a and 421a.

The horizontal scanning is performed in each of the forward path and the backward path of the vertical scanning to render an image. Therefore, when the forward path is switched to the backward path or when the backward path is switched to the forward path in the vertical scanning, it is unnecessary to suddenly change the deflecting angle of the movable plate 421a. This makes it possible to easily and surely adjust the deflecting angle of the movable plate 421a.

Modification of the Operation of the Distortion Correcting Unit

A modification of the operation of the distortion correcting unit 5 is explained below with reference to FIGS. 10A and 10B.

In the projector 2 shown in FIGS. 10A and 10B, the amplitude of the laser beam LL in the light emission state is not fixed along the vertical direction. However, the projector 2 is configured to adjust the deflecting angle of the movable plate 411a to align the amplitude of the laser beam LL in the light emission state along the vertical direction compared with not performing adjustment of the deflecting angle of the movable plate 411a. Consequently, the width on the upper side of a renderable region 912 where an image can be rendered and the shape of the renderable region 912 changes to be closer to a rectangle (including a square). Therefore, it is possible to reduce the non-rendering region.

In the projector 2, the rectangular rendering region 911 is set on the display surface 91, i.e., in the renderable region 912. Driving of the light source unit 3 is controlled such that the laser beam. LL emitted from the light source unit 3 is projected (irradiated) in the rendering region 911. This makes it possible to prevent keystone distortion of an image.

Rendering-Position Changing Unit

The rendering-position changing unit 6 is explained below.

As shown in FIG. 3, the rendering-position changing unit 6 includes a unit pivoting mechanism 61 and a scanner pivoting mechanism 62.

The unit pivoting mechanism 61 has a function of pivoting the light source unit (the light emitting unit) 3 and the light scanning unit 4 as one body (unit). In this embodiment, the unit pivoting mechanism 61 pivots the light source unit (the light emitting unit) 3 and the light scanning unit 4 to thereby move the rendering region 911 and the image g mainly in the direction of the horizontal scanning explained above.

As shown in FIG. 11, the unit pivoting mechanism 61 includes a supporting section 611 that pivotably supports the light source unit 3 and the light scanning unit 4 and a motor 612 that pivots the supporting section 611.

The supporting section 611 includes a shaft section 613 having an axis X1 as the center axis. The shaft section 613 is attached to an attaching section 111 of the housing 11 via a bearing 614.

This makes it possible to pivot the light source unit 3 and the light scanning unit 4 around the predetermined axis X1 together with the supporting section 611. Since the light source unit 3 and the light scanning unit 4 are integrally pivoted in this way, it is possible to change the positions of the rendering region 911 and the image g without requiring adjustment of alignment of the light source unit 3 and the light scanning unit 4.

In this embodiment, the predetermined axis X1 is set along the vertical direction. This makes it possible to move the rendering region 911 and the image g in the direction of the horizontal scanning while suppressing distortion due to a change in the position of the rendering region 911.

A first gear 615 is provided in the supporting section 611. In the first gear 615, plural teeth arranged along the circumferential direction of the shaft section 613 (the axis X1) are provided.

On the other hand, the motor 612 includes a shaft section 616 that rotates around an axis. A second gear 617 that meshes with the first gear 615 is attached to the shaft section 616. In the second gear 617, plural teeth arranged along the circumferential direction of the shaft section 616 are provided.

Such a motor 612 is attached to the attaching section 111 and rotates the second gear 617.

More specifically, as shown in FIG. 12A, the motor 612 rotates the second gear 617 counterclockwise to thereby rotate the supporting section 611 clockwise around the shaft section 613. This makes it possible to move the emitting direction of the laser beam LL (i.e., the position of the rendering region 911) to the right side in FIGS. 12A and 12B. On the other hand, as shown in FIG. 12B, the motor 612 rotates the second gear 617 clockwise to thereby rotate the supporting section 611 counterclockwise around the shaft section 613. This makes it possible to move the emitting direction of the laser beam. LL (i.e., the position of the rendering region 911) to the left side in FIGS. 12A and 12B.

The unit pivoting mechanism (the unit pivoting unit) 61 explained above integrally pivots the light source unit 3 and the light scanning unit 4. Therefore, it is possible to increase a range in which the display position of the image g (the position of the rendering region 911) can be changed (a range in which the image g can be displayed). It is unnecessary to separately perform alignment adjustment of the light source unit 3 and the light scanning unit 4 to change the position of the rendering region 911. It is easy to design and manufacture the projector 2. The unit pivoting mechanism (the unit pivoting unit) 61 may be configured not only to integrally pivot the light source unit 3 and the light scanning unit 4 around the axis X1 but also to pivot the light source unit 3 and the light scanning unit 4 around an axis orthogonal to the axis X1. In this case, even if the scanner pivoting mechanism 62 explained later is omitted, it is possible to two-dimensionally move the rendering region 911.

On the other hand, the scanner pivoting mechanism 62 has a function of pivoting the optical scanner 42 for vertical scanning. In this embodiment, the scanner pivoting mechanism 62 pivots the optical scanner 42 to thereby move the rendering region 911 and the image g in the direction of the vertical scanning.

As shown in FIG. 13, the scanner pivoting mechanism 62 includes a supporting section 621 that supports the optical scanner 42 for vertical scanning and a motor 622 that pivots the supporting section 621.

The motor 622 includes a shaft section 623 that rotates around an axis. The supporting section 621 is attached to the shaft section 623.

Although not shown in the figure, the motor 622 is attached (fixed) to the supporting section 611 of the unit pivoting mechanism 61.

The motor 622 pivots the optical scanner 42 around the axis of the shaft section 623 (specifically, an axis coinciding with the pivoting center axis J2) together with the supporting section 621. This makes it possible to move the emitting direction of the laser beam LL (i.e., the position of the rendering region 911) in the direction of the vertical scanning.

The scanner pivoting mechanism (the scanner pivoting unit) 62 explained above pivots the entire optical scanner 42 with respect to the light source unit 3. Therefore, it is possible to increase a range in which the display position of the image g (the position of the rendering region 911) can be changed (a range in which an image can be displayed). In particular, in this embodiment, of the optical scanners 41 and 42, the scanner pivoting mechanism 62 pivots the optical scanner 42 on the front side in the traveling direction of the laser beam LL. Therefore, it is possible to relatively easily increase the range in which the position of the rendering region 911 can be changed. The scanner pivoting mechanism (the scanner pivoting unit) 62 may be configured not only to pivot the optical scanner 42 around the pivoting center axis J2 but also to pivot the optical scanner 42 around an axis orthogonal to the pivoting center axis J2. In this case, the unit pivoting mechanism 61 may be omitted. The scanner pivoting mechanism 62 may be configured to pivot the optical scanner 41. In this case, since the range in which the rendering region 911 can be changed is limited by the area of the optical reflecting section 421e of the optical scanner 42, to increase such a range, it is necessary to increase the area of the light reflecting section 421e.

As explained above, the rendering-position changing unit 6 can two-dimensionally change the position of the rendering region 911 on the display surface 91. The rendering-position changing unit 6 is controlled to be driven by the control unit 8 explained later.

The projector 2 explained above includes the light source unit 3 and the light scanning unit 4 explained above and uses a laser beam. Therefore, the projector 2 is focus-free and can perform near projection. The position of the rendering region 911 can be adjusted to an arbitrary position without being limited by a setting position of the projector 2. When the laser beam is used, an optical system such as a lens for changing the laser beam to parallel rays can be omitted or simplified. Therefore, it is possible to realize a reduction in the size of the light source unit 3 and a reduction in the size of the image forming apparatus 1.

Since the projector 2 includes the optical scanners 41 and 42 explained above, the configuration of the projector 2 is relatively simple.

In this embodiment, the display surface 91 is set on the floor surface of the floor 9 as explained above. However, the projector 2 (the housing 11) is set on a wall surface W1 of a wall W orthogonal to the floor 9.

Consequently, for example, compared with setting the projector 2 on a ceiling surface of a ceiling and setting the display surface 91 on the floor surface of the floor 9, it is possible to reduce optical path length of light emitted from the projector 2. Therefore, it is possible to prevent or suppress the light emitted from the projector 2 from being blocked by a pedestrian or the like. As a result, it is possible to display a desired image on the display surface 91 without being affected by a peripheral environment (population density, etc.). Since the setting surface of the projector 2 is the wall surface W1, it is also possible to prevent or suppress the projector 2 from obstructing, for example, walking of a pedestrian.

The projector 2 is set on the wall surface W1 and the display surface 91 is set on the floor surface of the floor 9. This makes it possible to allow a person around the image forming apparatus 1 to recognize the presence of an image on the inside or the outside of a building. Therefore, for example, when an image for advertisement such as a commercial video or a promotion video is used as a display image, it is possible to show an excellent advertisement function.

Detecting Unit

The detecting unit 7 has a function of detecting whether the person H is present in the detection region S set near the display surface 91 and detecting, when the person H is present in the detection region S, a moving state of the person H (see FIG. 14).

As shown in FIG. 2, the detecting unit 7 includes a human sensor 71, a storing section 72, and a calculating section 73.

The human sensor 71 has a function of detecting whether the person H is present in the detection region S and detecting, when the person H is present in the detection region S, the position of the person H.

Such a human sensor 71 includes two sensor sections 71a and 71b. The sensor section 71a is attached to one housing 11a and the sensor section 72b is attached to the other housing 11b. In this embodiment, the sensor sections 71a and 71b are attached to the housings 11a and 11b. However, the invention is not limited to this. The sensor sections 71a and 71b may be set on the wall surface W1 or the like in an independent state without being attached to the housings 11a and 11b. The sensor section 71a or the sensor section 71b may be omitted.

The sensor section 71a can detect the presence or absence of a person near the sensor section 71a and can measure a separation distance between the sensor section 71a and the detected person and the direction of the person. The sensor section 71b can detect the presence or absence of a person near the sensor section 71b and can measure a separation distance between the sensor section 71b and the detected person and the direction of the person.

Since such two sensor sections 71a and 71b are used, compared with detecting a person with one sensor section, it is possible to expand a region in which a person can be detected (a detection region). Even when plural people are present in the detection region, it is possible to accurately detect the presence and the positions of the people.

Each of such sensor sections 71a and 71b is not specifically limited as long as the sensor section can show the functions explained above. For example, one of an infrared sensor making use of an infrared ray, an ultrasonic sensor making use of ultrasound, a laser type sensor (a laser displacement gauge) making use of a laser beam, and a CCD image sensor can be used or two or more of these sensors can be used in combination.

As shown in FIG. 14, the detection region S, which is a region in which the presence or absence and the position of a person are determined, is set for such a human sensor 71.

The detection region S includes a first detection region S1, a second detection region S2, and a third detection region S3.

The first detection region S1 is formed in a semicircular shape with the sensor section 71a as the center when viewed from the vertical line direction (above).

When viewed from the vertical line direction (above), the first detection region S1 is set to include a range in which the position of the rendering region 911 by the projector 2a can be moved. In this embodiment, when viewed from the vertical line direction (above), the first detection region S1 is set to generally coincide with the range in which the position of the rendering region 911 by the projector 2a can be moved.

In this embodiment, the first detection region S1 coincides with an effective detection region of the sensor section 71a (a region where the presence or absence of a person and the position and the direction of the presence of the person can be detected). The first detection region S1 does not have to coincide with the effective detection region of the sensor section 71a and only has to be included in the effective detection region of the sensor section 71a or the sensor section 71b. In that case, the detection whether a person is present in the first detection region S1 can be performed by, for example, determining the presence of a person on the basis of the position and the direction of a person detected by the sensor section 71a.

Similarly, the second detection region S2 is formed in a semicircular shape with the sensor section 71b as the center when viewed from the vertical line direction (above).

When viewed from the vertical line direction (above), the second detection region S2 is set to include a range in which the position of the rendering region 911 by the projector 2b can be moved. In this embodiment, when viewed from the vertical line direction (above), the second detection region S2 is set to generally coincide with the range in which the position of the rendering region 911 by the projector 2b can be moved.

In this embodiment, the second detection region S2 coincides with an effective detection region of the sensor section 71b (a region where the presence or absence of a person and the position and the direction of the presence of the person can be detected). The second detection region S2 does not have to coincide with the effective detection region of the sensor section 71b and only has to be included in the effective detection region of the sensor section 71a or the sensor section 71b. In that case, the detection whether a person is present in the second detection region S2 can be performed by, for example, determining the presence of a person on the basis of the position and the direction of a person detected by the sensor section 71b.

In this embodiment, the second detection region S2 has shape and size same as those of the first detection region S1.

In this embodiment, the first detection region S1 and the second detection region S2 have portions overlapping each other. Such portions form a third detection region S3. Detection whether a person is present in the third detection region S3 can be determined according to whether a person is present in both the first detection region S1 and the second detection region S2.

The position, the shape, and the size of the detection region S are determined according to conditions such as the setting position of the projectors 2 and the content and the size of an image to be displayed and are not specifically limited. For example, the shape of the detection region S may be a rectangular, a square, or the like.

The human sensor 71 for which such a detection region S is set determines, when the sensor section 71a or the sensor section 71b detects the presence of the person H, in which region (i.e., the detection region S) of the first detection region S1 and the second detection region S2 the person H is present. The human sensor 71 sends a result of the detection (whether the person H is present in the detection region S) to the control unit 8. Such determination may be performed on a real time basis (continuously) or may be intermittently performed.

The human sensor 71 calculates, when the sensor section 71a or the sensor section 71b detects the presence of the person H, the position of the person H on the basis of a separation distance between the person H and the sensor section 71a or 71b (hereinafter also simply referred to as "separation distance L1") and the direction of a segment connecting the sensor section 71a or the sensor section 71b and the person H. The human sensor 71 transmits a result of the calculation to the storing section 72 and the control unit 8.

The storing section 72 has a function of storing, at every predetermined time, the position detected by the human sensor 71 as position information. By using such position information at every predetermined time, it is possible to calculate a moving state (specifically, the moving direction and the moving speed) of the person H.

Information stored in such a storing section 72 is input to the calculating section 73.

The calculating section 73 has a function of calculating the moving direction and the moving speed of the person H on the basis of the position information stored in the storing section 72. The calculating section 73 sends a calculation result (the moving direction and the moving speed of the person H) to the control unit 8. Such calculation may be performed on a real time basis (continuously) or may be intermittently performed.

The detecting unit 7 explained above detects the position, the moving direction, and the moving speed of the person H as a moving state of the person H. This makes it possible to predict the movement of the person H. Therefore, it is possible to display, to the moving person H, the image g in a desired position.

The detecting unit 7 includes the sensor sections 71a and 71b, the storing section 72, and the calculating section 73 explained above. Therefore, it is possible to detect the position, the moving direction, and the moving speed of the person H with a relatively simple and inexpensive configuration.

The detecting unit 7 is explained above. However, the configuration of the detecting unit 7 is not limited to the configuration. For example, as the sensor sections 71a and 71b, one or plural pressure sensors set under the floor of the detection region S may be used.

The number of sensor sections is not limited to two as in this embodiment and may be one or may be three or more.

Control Unit

The control unit 8 controls driving of the projector 2 on the basis of a detection result of the detecting unit 7.

In particular, the control unit 8 has a function of changing, on the basis of a detection result of the detecting unit 7, the position of the rendering region 911 by the projector 2 to guide the person H present in the detection region S to the guiding point P1.

More specifically, first, when the person H enters the detection region 5, the control unit 8 determines the person H as a target. While the target person H is present in the detection region S, the control unit 8 changes the position of the rendering region 911 according to the position, the moving direction, and the moving speed of the person H. When plural people enters the detection region S, the control unit 8 only has to determine a person entering the detection region S first as a target. When plural people are present in the detection region S, the control unit 8 may determine one person closest to the projector 2a or the projector 2b as a target.

As shown in FIG. 15, a segment connecting a position (a center position) H1 of the person H and the guiding point P1 is represented as a1, a segment extending in a moving direction m of the person H is represented as a2, and a segment connecting the position H1 of the person H and a position (a center position) 911a of the rendering region 911 is represented as a3. The control unit 8 changes the position of the rendering region 911 such that an angle α [°] formed by the segment a1 and the segment a2 and an angle β [°] formed by the segment a2 and the segment a3 satisfy a predetermined relation. In FIG. 15, a separation distance between the position H1 of the person H and the guiding point P1 is shown as L1 and a separation distance between the position H1 of the person H and the position 911a of the rendering region 911 is shown as L2.

Changes of the position of the rendering region 911 and the content of the image g performed when the person H is present in the detection region S are specifically explained with reference to FIGS. 16 to 18.

First, as shown in FIG. 16, the control unit 8 determines whether the angle α is equal to or smaller than 90° (step S1).

When the angle α is equal to or larger than 90°, the control unit 8 determines that the person H is not a target and ends the display of the image g. On the other hand, when the angle α is smaller than 90°, the control unit 8 determines the person H as a target and sets the position of the rendering region 911 (step S2).

In the setting of the position of the rendering region 911, as shown in FIG. 17, first, the control unit 8 determines whether a predetermined time (hereinafter also referred to as "appeal period") for causing the target person H to pay attention to the image g has elapsed (step S21). Such an appeal period is not specifically limited but is set to, for example, about 1 to 3 seconds.

When the appeal period has not elapsed, the control unit 8 sets the position 911a of the rendering region 911 such that the angle β is equal to 0 [°] and the separation distance L2 is equal to a predetermined value (a fixed value) (step S22). Therefore, the position 911a of the rendering region 911 is located on the segment a2 until the appeal period elapses. This makes it possible to cause the target person H to pay attention to the image g.

On the other hand, when the appeal period has elapsed, the control unit 8 determines whether the person H is moving (step S23).

When the person H is moving, the control unit 8 determines whether the angle α is equal to or smaller than a predetermined value (step S24). The predetermined value can be set in a range of 0 to 90 [°]. However, the predetermined value is desirably 10 to 45 [°] and more desirably 20 to 40 [°]. This makes it possible to effectively switch step S25 and step S26 to guide the person H to the guiding point P1.

When the angle α exceeds the predetermined value, the control unit 8 sets the position 911a of the rendering region 911 such that the angle β is equal to kα[°] and the separation distance L2 is equal to the predetermined value (the fixed value) (step S25). "k" is a constant set in a range of 1/10 to 2/3. However, "k" is desirably about 1/10 to 1/2, more desirably about 1/10 to 1/3, and still more desirably about 1/10 to 1/4. This makes it possible to effectively guide the person H to the guiding point P1 when the angle α is large.

On the other hand, when the angle α is equal to or smaller than the predetermined value, the control unit 8 sets the position 911a of the rendering region 911 such that the angle β is equal to the angle α and the separation distance L2 is equal to the predetermined value (the fixed value) (step S26). This makes it possible to effectively guide the person H to the guiding point P1 when the angle α is small.

When the person H is not moving (stands still) in the determination in step S23, the control unit 8 sets the position 911a of the rendering region 911 on the segment a1 such that the separation distance L2 fluctuates in a range of 0 to L1 (step S27). This makes it possible to effectively guide the person H to the guiding point P1 when the person H stands still.

After setting the position 911a of the rendering region 911 in any one of steps S22, S25, S26, and S27, as shown in FIG. 16, the control unit 8 sets the content of the image g (step S3).

The content of the image g is not specifically limited as long as the content of the image g can guide the person H to the guiding point P1. Examples of the content of the image g include characters, a still image, and a moving image. One of the characters, the still image, and the moving image can be used or two or more of the same can be used in combination.

More specifically, in step S3, as the content of the image g, for example, as shown in FIG. 18, an image for urging guidance of the person H to the guiding point P1 (hereinafter also referred to as "guidance display") is set.

In the guidance display shown in FIG. 18, for example, when a character "A" represents a store name at the guiding point P1, besides an image g1 including the character "A", images such as an image g2 including an arrow representing a direction from the position of the person H to the store and an image g3 including characters representing distance information from the position of the person H to the store can be included as the content of the image g. It is possible to improve recognition of the store and guide the person H to the store (the guiding point) by continuously or intermittently perform such a change of the content of the image g. It is also possible to display an image representing a scheduled time of arrival at the store on the basis of the moving speed of the person H and the distance to the store.

After setting the guide display in this way, the control unit 8 determines whether a predetermined time (hereinafter also referred to as "guiding period") for determining whether it is highly likely that the target person H is guided to the guiding point P1 has elapsed (step S4). Such a guiding period is set according to, for example, the size of the detection region S and is not specifically limited. However, the guiding period is set to, for example, about 10 to 60 seconds.

When the guiding period has elapsed, the control unit 8 determines that the person H is not a target and ends the display of the image g. On the other hand, when the guiding period has not elapsed, the control unit 8 determines whether the person H has arrived at the guiding point P1 (step S5). The determination whether the person H has arrived at the guiding point P1 can be performed according to whether the length of the separation distance L1 decreases to be equal to or smaller than a predetermined distance. In this embodiment, when the separation distance L1 is equal to or smaller than the separation distance L2, the control unit 8 determines that the person H has arrived at the guiding point P1. When the separation distance L1 is larger than the separation distance L2, the control unit 8 determines that the person H has not arrived at the guiding point P1.

When the person H has not arrived at the guiding point P1, the control unit 8 shifts to step S1. On the other hand, when the person H has arrived at the guiding point P1, the control unit 8 sets, as the content of the image g, an image for informing that the person H has arrived at the guiding point P1 (hereinafter also referred to as "arrival display") (step S6). Thereafter, the control unit 8 ends the display of the image g.

Such arrival display is performed for a predetermined time (about 1 to 3 seconds). Such arrival display is not specifically limited as long as the arrival display indicates that the person H has arrived at the guiding point P1. Examples of the arrival display include characters, a still image, and a moving image. One of the characters, the still image, and the moving image can be used or two or more of the same can be used in combination. Such arrival display may be omitted.

As explained above, the control unit 8 changes the position of the rendering region 911 and the content of the image g on the basis of a detection result of the detecting unit 7 to guide the person H present in the detection region S to the guiding point P1.

At this point, as shown in FIG. 15, when the person H is moving in the detection region S, the control unit 8 controls driving of the projector 2 such that the position of the rendering region 911 is changed while maintaining a state in which the rendering region 911 is located on the front side in the moving direction m of the person H and on the guiding point P1 side. Consequently, since the image g is displayed on the front side of the moving person H, the moving person H can easily recognize the presence and the content of the image g. It is possible to display, to the person H, an image having appropriate content by changing the content of the image g according to the position of the target person H. It is possible to direct the line of sight of the target person H to the guiding point P1 side by displaying the image g in a position on the guiding point P1 side with respect to the moving direction of the moving person H. As a result, the target person H is guided to the guiding point P1 consciously or unconsciously.

The control unit 8 controls driving of the projector 2 to continuously or intermittently change the position of the rendering region 911 according to the movement of the person H. This allows the moving person H to easily recognize the presence and the content of the image g.

When the person H is moving in the detection region S, the control unit 8 controls driving of the projector 2 such that the position of the rendering region 911 maintains the fixed separation distance L2 from the position of the person H. This allows the moving person H to easily see the presence and the content of the image g.

The separation distance L2 between the position (the center position) of the rendering region 911 and the position (the center position) of the person H only has to be a degree for allowing the person H to recognize the presence and the content of the image g. The separation distance L2 is different depending on, for example, the area of the rendering region 911 and is not specifically limited. However, the separation distance L2 is desirably 50 to 300 cm and more desirably 70 to 200 cm. This allows the person H to easily recognize the presence and the content of the image g.

When such a separation distance L2 is smaller than the lower limit value, in some case, an image does not come into view of a person, for example, if the person is moving at high moving speed. On the other hand, when the separation distance L2 exceeds the upper limit value, it is difficult for the person to recognize the presence and the content of the image g, for example, if the rendering region 911 and the image g are small.

The control unit 8 controls driving of the distortion correcting unit 5 on the basis of a detection result of the detecting unit 7. This makes it possible to display the image g such that the person H can easily see the image g even if the position of the rendering region 911 is changed.

In such distortion correction of the rendering region 911 and the image g, the control unit 8 controls driving of the distortion correcting unit 5 to fix the directions of the rendering region 911 and the image g with respect to the person H. In this embodiment, the direction of the rendering region 911 is set such that upper and lower sides of the rendering region 911 formed in a rectangular shape are perpendicular to the segment a3 connecting the position H1 of the person H and the position 911a of the rendering region 911. The direction of the image g is fixed with respect to the direction of the rendering region 911. This allows the moving person H to easily see the content of the image g.

The control unit 8 controls driving of the distortion correcting unit 5 to fix the shape of the rendering region 911 (in this embodiment, a rectangle). This allows the moving person H to easily see the content of the image g.

The control unit 8 controls driving of the distortion correcting unit 5 to fix the dimension of the rendering region 911. This allows the moving person H to easily see the content of the image g.

In this embodiment, as shown in FIG. 14, when the person H moves from the right side to the left side in the detection region S in FIG. 14, the control unit 8 displays the image g using the projector 2a when such a person H is present only in the first detection region S1 (in the first detection region S1 and outside the third detection region S3). The control unit 8 displays the image g using the projector 2b when the person H is present only in the second detection region S2 (in the second detection region S2 and outside the third detection region S3) and when the person H is present in the third detection region S3. By performing such switching of the two projectors 2a and 2b, it is possible to prevent the person H from being present between the projector 2 and the rendering region 911 to obstruct rendering of the projector 2.

When the person H moves from the left side to the right side in the detection region S in FIG. 14, the control unit 8 only has to display the image g using the projector 2b when such a person H is present in the third detection region S3 and display the image g using the projector 2a when the person H is present only in the first detection region S1 and when the person H is present only in the second detection region S2. In the example explained above, the projector used when the person H is present in the third detection region S3 is different when the person H moves from the right side to the left side in the detection region S and when the person moves from the left side to the right side in the detection region S in FIG. 14. It is also possible that the third detection region S3 is divided into a first portion on the first detection region S1 side (the projector 2a side) and a second portion on the second detection region S2 side and the projector 2a is used when a person is present in such a first portion and the projector 2b is used when a person is present in such a second portion.

With the image forming apparatus 1 according to this embodiment explained above, even if the person H moves, it is possible to display the image g in a position where the person H can easily see the image g. Therefore, it is possible to allow even the moving person H to easily recognize the presence and the content of the image g.

For example, the image forming apparatus 1 can display, to the person H, an image in a position and with content for urging guidance to the guiding point P1 to guide the target person H to the guiding point P1. Therefore, it is possible to guide the target person H to a desired point (the guiding point P1).

Second Embodiment

An image forming apparatus according to a second embodiment of the invention is explained below.

Figure 19:
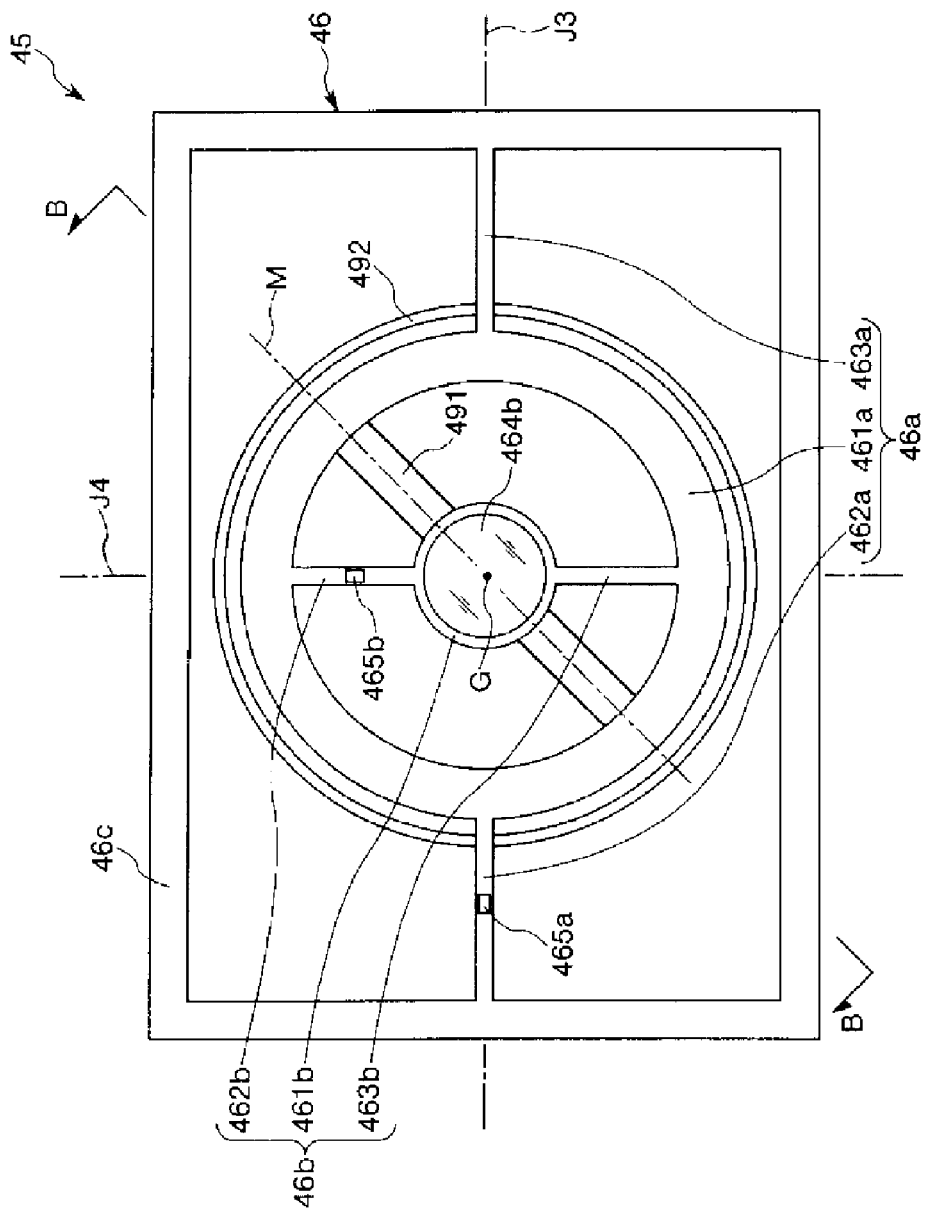
FIG. 19 is a schematic plan view showing an optical scanner of a projector included in an image forming apparatus according to a second embodiment of the invention.
Figure 20:
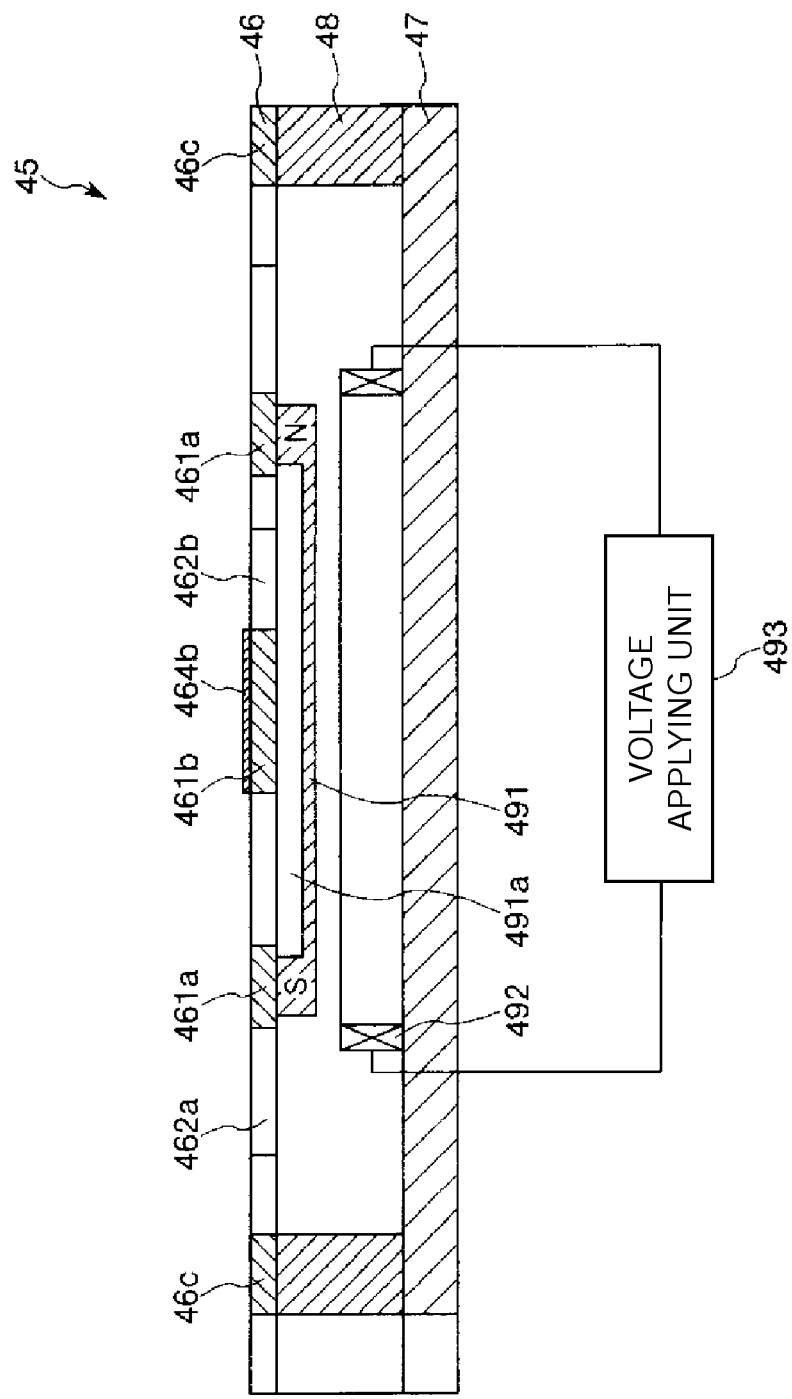
FIG. 20 is a sectional view taken along line B-B shown in FIG. 19.
Figure 21:
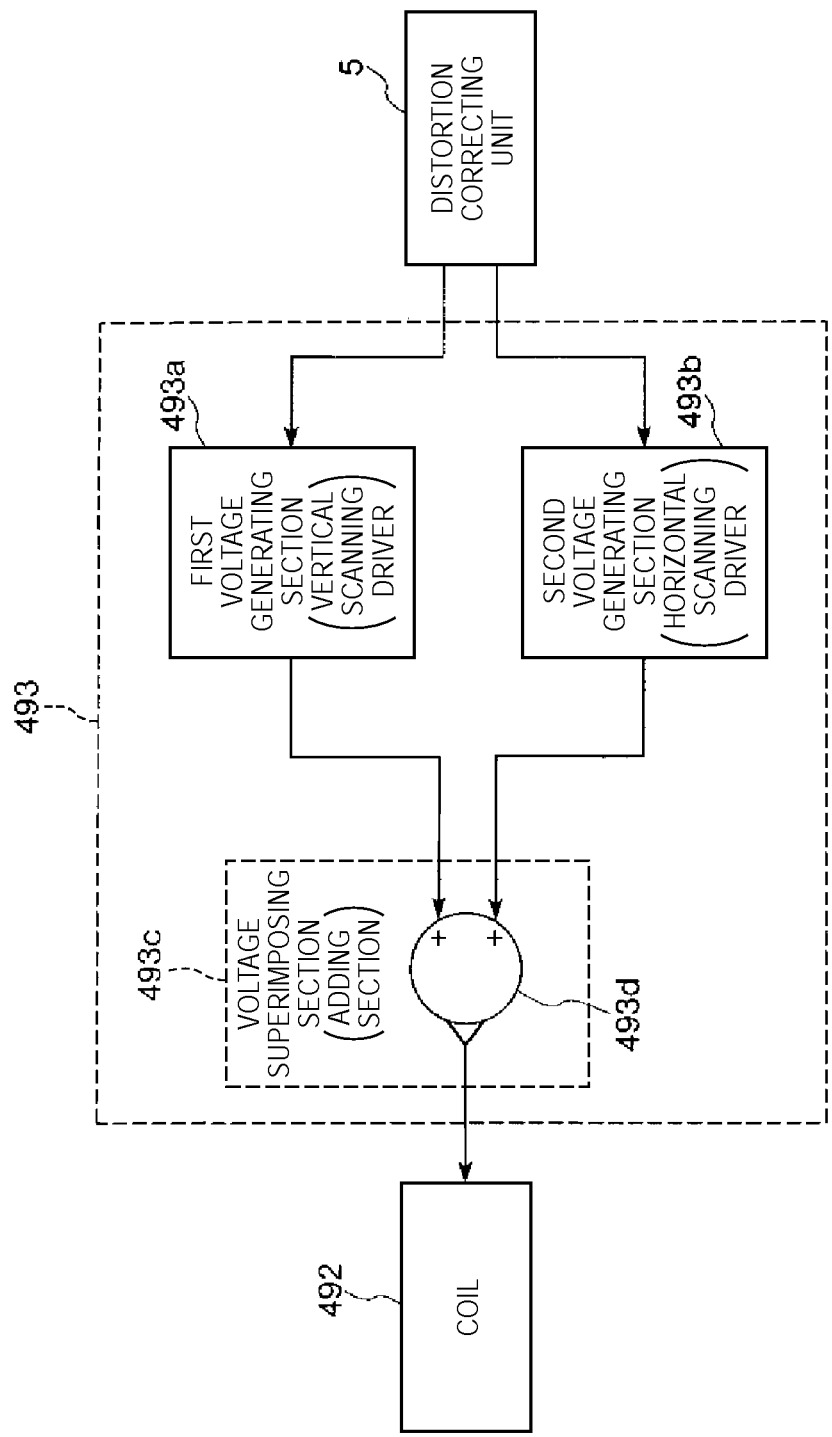
FIG. 21 is a block diagram showing a voltage applying unit of a driving unit included in the optical scanner shown in FIG. 19.
Figure 22A:
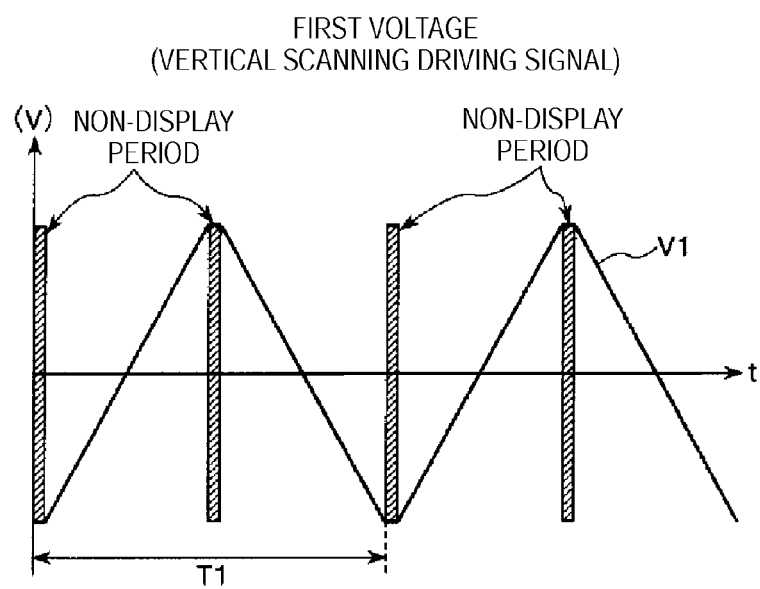
FIGS. 22A and 22B are diagrams showing an example of voltages generated by a first voltage generating section and a second voltage generating section included in the voltage applying unit shown in FIG. 21.
Figure 22B:
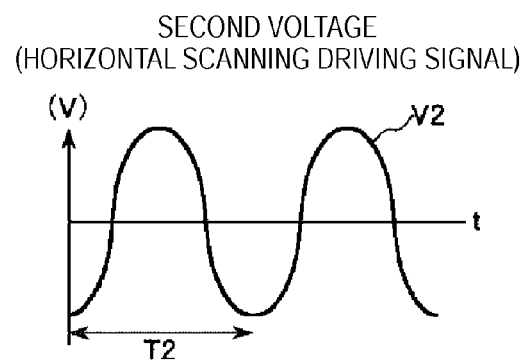
Figures 23A, 23B:
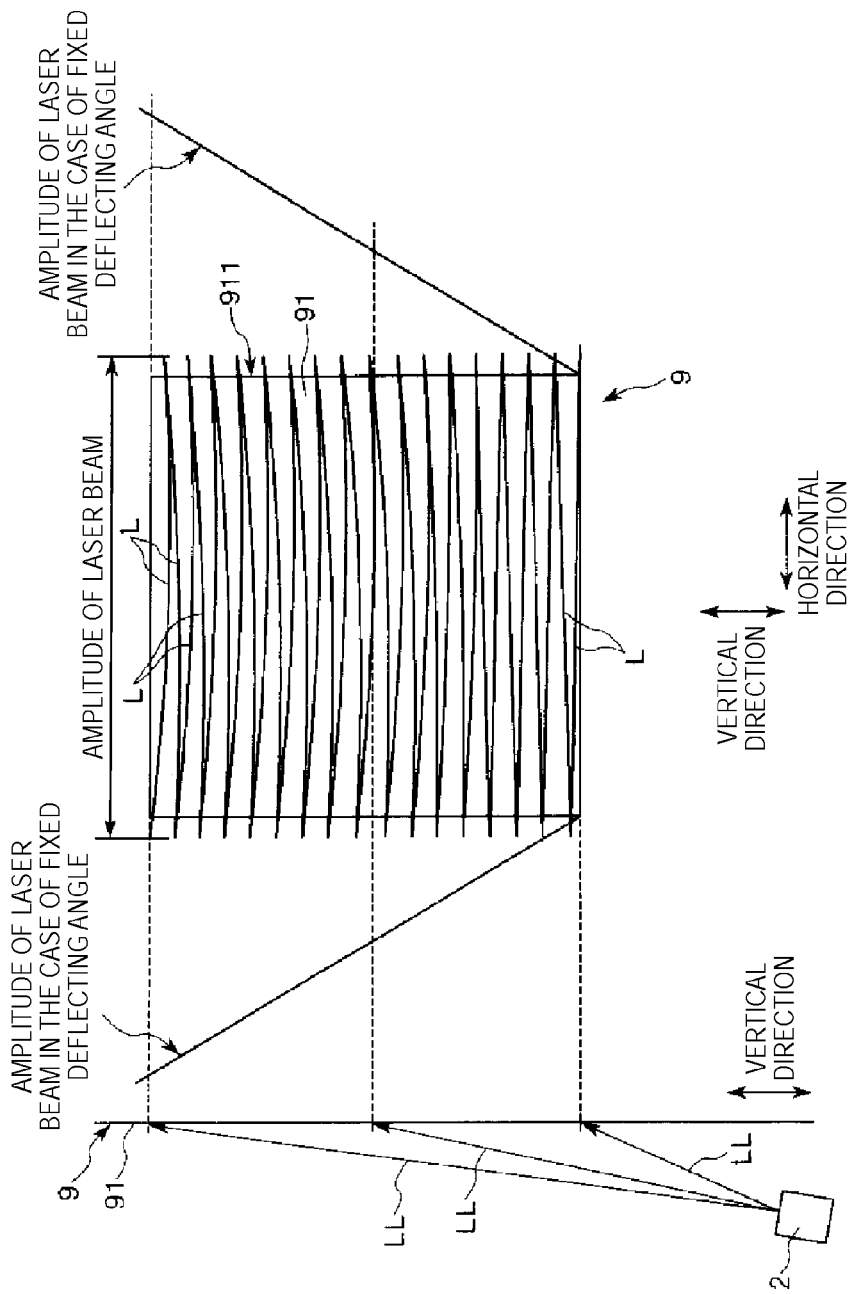
FIG. 23A is a side view for explaining the operation of the projector included in the image forming apparatus according to the second embodiment of the invention.
FIG. 23B is a front view for explaining the operation of the projector included in the image forming apparatus according to the second embodiment of the invention.

FIG. 19 is a schematic plan view showing an optical scanner of a projector included in the image forming apparatus according to the second embodiment of the invention. FIG. 20 is a sectional view taken along line B-B shown in FIG. 19. FIG. 21 is a block diagram showing a voltage applying unit of a driving unit included in the optical scanner shown in FIG. 19. FIGS. 22A and 22B are diagrams showing an example of voltages generated by a first voltage generating section and a second voltage generating section included in the voltage applying unit shown in FIG. 21. FIG. 23A is a side view for explaining the operation of the projector included in the image forming apparatus according to the second embodiment of the invention. FIG. 23B is a front view for explaining the operation of the projector included in the image forming apparatus according to the second embodiment of the invention. For convenience of explanation, a front side of a paper surface, an inner side of the paper surface, a right side, and a left side in FIG. 19 are respectively referred to as "upper", "lower", "right", and "left". An upper side, a lower side, a right side, and a left side in FIG. 20 are hereinafter respectively referred to as "upper", "lower", "right", and "left".

Concerning the image forming apparatus according to the second embodiment, differences from the image forming apparatus according to the first embodiment are mainly explained below. Explanation of similarities is omitted.

The image forming apparatus according to the second embodiment is substantially the same as the image forming apparatus according to the first embodiment except that the configuration of an optical scanner included in a projector is different and a track of scanning in the first direction (horizontal scanning) on the display surface 91 is not linear. In FIG. 21 and FIGS. 23A and 23B, components same as those in the first embodiment are denoted by the same reference numerals and signs.

A light scanning unit according to this embodiment includes one optical scanner 45 of a so-called two-degree-of-freedom oscillation system (two-dimensional scanning).

The optical scanner 45 includes a substrate 46 including a first oscillation system. 46a, a second oscillation system 46b, and a supporting section 46c shown in FIG. 19, an opposed substrate 47 arranged to be opposed to the substrate 46, a spacer member 48 provided between the substrate 46 and the opposed substrate 47, a permanent magnet 491, and a coil 492.

The first oscillation system 46a includes a driving section 461a having a frame shape provided on the inner side of the supporting section 46c having a frame shape and a pair of first coupling sections 462a and 463a that support the driving section 461a in the center of the supporting section 46c.

The second oscillation system 46b includes a movable plate 461b provided on the inner side of the driving section 461a and a pair of second coupling sections 462b and 463b that support the movable plate 461b in the center of the driving section 461a.

The driving section 461a is formed in an annular shape in plan view of FIG. 19. The shape of the driving section 461a is not specifically limited as long as the driving section 461a is formed in a frame shape. For example, the driving section 461a may be formed in a square annular shape in plan view of FIG. 19. The permanent magnet 491 is joined to the lower surface of such a driving section 461a.

Each of the first coupling sections 462a and 463a is formed in a longitudinal shape and is elastically deformable. Each of the first coupling sections 462a and 463a couples the driving section 461a and the supporting section 46c to make the driving section 461a pivotable with respect to the supporting section 46c. Such first coupling sections 462a and 463a are provided coaxially with each other and configured such that the driving section 461a pivots with respect to the supporting section 46c around this axis (hereinafter referred to as "pivoting center axis J3").

A piezoelectric element 465a for detecting the angle (a pivoting angle around the pivoting center axis J3) (behavior) of the driving section 461a is provided in the first coupling section 462a.

The movable plate 461b is formed in a circular shape in plan view of FIG. 19. The shape of the movable plate 461b is not specifically limited as long as the movable plate 461b can be formed on the inner side of the driving section 461a. For example, the movable plate 461b may be formed in an elliptical shape or may be formed in a square shape in plan view of FIG. 19. A light reflecting section 464b having light reflectivity is formed on the upper surface of such a movable plate 461b.

Each of the second coupling sections 462b and 463b is formed in a longitudinal shape and is elastically deformable. Each of the second coupling sections 462b and 463b couples the movable plate 461b and the driving section 461a to make the movable plate 461b pivotable with respect to the driving section 461a. Such second coupling sections 462b and 463b are provided coaxially with each other and configured such that the movable plate 461b pivots with respect to the driving section 461a around this axis (hereinafter referred to as "pivoting center axis J4").

A piezoelectric element 465b for detecting the angle (a pivoting angle around the pivoting center axis J4) (behavior) of the movable plate 461b is provided in the second coupling section 462b.

As shown in FIG. 19, the pivoting center axis J3 and the pivoting center axis J4 are orthogonal to each other. Each of the centers of the driving section 461a and the movable plate 461b is located on an intersection of the pivoting center axis J3 and the pivoting center axis J4 in plan view of FIG. 19. For convenience of explanation, the intersection of the pivoting center axis J3 and the pivoting center axis J4 is hereinafter also referred to as "intersection G".

As shown in FIG. 20, the substrate 46 explained above is joined to the opposed substrate 47 via the spacer member 48. The coil 492 that generates a magnetic field acting on the permanent magnet 491 is provided on the upper surface of the opposed substrate 47.

The permanent magnet 491 is provided along a segment passing the intersection G and tilting with respect to the pivoting center axis J3 and the pivoting center axis J4 (this segment is also referred to as "segment M") in plan view of FIG. 19. In such a permanent magnet 491, one side in a longitudinal direction of the permanent magnet 491 with respect to the intersection G is the S pole and the other side is the N pole. In FIG. 20, the left side of the longitudinal direction of the permanent magnet 491 is the S pole and the right side is the N pole.

In plan view of FIG. 19, a tilt angle θ of the segment M with respect to the pivoting center axis J3 is desirably 30 to 60 degrees, more desirably 40 to 50 degrees, and still more desirably about 45 degrees. Since the permanent magnet 491 is provided in this way, it is possible to smoothly pivot the movable plate 461b around each of the pivoting center axis J3 and the pivoting center axis J4. In this embodiment, the segment M tilts about 45 degrees with respect to each of the pivoting center axis J3 and the pivoting center axis J4.

As shown in FIG. 20, a recess 491a is formed on the upper surface of the permanent magnet 491. The recess 491a is a clearance section for preventing contact of the permanent magnet 491 and the movable plate 461b. Since such a recess 491a is formed, when the movable plate 461b pivots around the pivoting center axis J3, it is possible to prevent the movable plate 461b from coming into contact with the permanent magnet 491.

The coil 492 is formed to surround the outer circumference of the driving section 461a in plan view of FIG. 19. This makes it possible to surely prevent contact of the driving section 461a and the coil 492 when the optical scanner 45 is driven. As a result, it is possible to set a separation distance between the coil 492 and the permanent magnet 491 relatively short and cause a magnetic field generated from the coil 492 to efficiently act on the permanent magnet 491.

The coil 492 is electrically connected to a voltage applying unit 493. When voltage is applied to the coil 492 by the voltage applying unit 493, a magnetic filed in an axis direction orthogonal to each of the pivoting center axis J3 and the pivoting center axis J4 is generated from the coil 492.

As shown in FIG. 21, the voltage applying unit 493 includes a first voltage generating section 493a that generates a first voltage V1 for pivoting the movable plate 461b around the pivoting center axis J3, a second voltage generating section 493b that generates a second voltage V2 for pivoting the movable plate 461b around the pivoting center axis J4, and a voltage superimposing section 493c that superimposes the first voltage V1 and the second voltage V2 and applies a superimposed voltage to the coil 492.

In the same manner as shown in FIG. 9 in the first embodiment, the first voltage generating section 493a generates the first voltage V1 (voltage for vertical scanning) that periodically changes at a period T1 twice as large as a frame frequency as shown in FIG. 22A.

The first voltage V1 has a waveform like a triangular wave. Therefore, the optical scanner 45 can effectively perform vertical back-and-forth scanning (sub-scanning) of light. The waveform of the first voltage V1 is not limited to this. The frequency (1/T1) of the first voltage V1 is not specifically limited as long as the frequency is suitable for vertical scanning. However, the frequency is desirably 15 to 40 Hz (about 30 Hz).

In this embodiment, the frequency of the first voltage V1 is adjusted to be a frequency different from a torsional resonant frequency of the first oscillation system 46a including the driving section 461a and the pair of first coupling sections 462a and 463a.

On the other hand, as shown in FIG. 22B, the second voltage generating section 493b generate the second voltage V2 (voltage for horizontal scanning) that periodically changes at a period T2 different from the period T1 as shown in FIG. 22B.

The second voltage V2 has a waveform like a sine wave. Therefore, the optical scanner 45 can effectively perform main scanning of light. The waveform of the second voltage V2 is not limited to this.

The frequency of the second voltage V2 is not specifically limited as long as the frequency is higher than the frequency of the first voltage V1 and suitable for horizontal scanning. However, the frequency is desirably 10 to 40 kHz. In this way, the frequency of the second voltage V2 is set to 10 to 40 kHz and the frequency of the first voltage V1 is set to about 30 Hz. This makes it possible to pivot the movable plate 461b around each of the pivoting center axis J3 and the pivoting center axis J4 at a frequency suitable for rendering on a screen. However, for example, a combination of the frequency of the first voltage V1 and the frequency of the second voltage V2 is not specifically limited as long as the movable plate 461b can be pivoted around each of the pivoting center axis J3 and the pivoting center axis J4.

In this embodiment, the frequency of the second voltage V2 is adjusted to be equal to a torsional resonant frequency of the second oscillation system 46b including the movable plate 461b and the pair of second coupling sections 462b and 463b. This makes it possible to increase a pivoting angle around the pivoting center axis J3 of the movable plate 461b.

When a resonant frequency of the first oscillation system 46a is represented as $f_1$ [Hz] and a resonant frequency of the second oscillation system. 46b is represented as $f_2$ [Hz], $f_1$ and $f_2$ desirably satisfy a relation $f_2 > f_1$ and more desirably satisfy a relation $f_2 \leq 10 f_1$. This makes it possible to more smoothly pivot the movable plate 461b around the pivoting center axis J4 at the frequency of the second voltage V2 while pivoting the movable plate 461b around the pivoting center axis J3 at the frequency of the first voltage V1.

Each of the first voltage generating section 493a and the second voltage generating section 493b is connected to the distortion correcting unit 5 and is driven on the basis of a signal from the distortion correcting unit 5. The voltage superimposing section 493c is connected to such first voltage generating section 493a and second voltage generating section 493b.

The voltage superimposing section 493c includes an adder 493d for applying voltage to the coil 492. The adder 493d receives the first voltage V1 from the first voltage generating section 493a, receives the second voltage V2 from the second voltage generating section 493b, and superimposes the voltages and applies a superimposed voltage to the coil 492.

The optical scanner 45 having the configuration explained above is driven as explained below.

For example, the voltage superimposing section 493c superimposes the first voltage V1 shown in FIG. 22A and the second voltage V2 shown in FIG. 22B and applies a superimposed voltage to the coil 492 (the superimposed voltage is also referred to as "voltage V3").

Then, a magnetic field for attracting the S pole side of the permanent magnet 491 to the coil 492 and separating the N pole side from the coil 492 and a magnetic field for separating the S pole side of the permanent magnet 491 from the coil 492 and attracting the N pole side to the coil 492 are alternately switched by voltage corresponding to the first voltage V1 in the voltage V3. Consequently, the driving section 461a pivots around the pivoting center axis J3 at the frequency of the first voltage V1 together with the movable plate 461b while torsionally deforming the first coupling sections 462a and 463a.

The frequency of the first voltage V1 is set extremely low compared with the frequency of the second voltage V2. The resonant frequency of the first oscillation system 46a is designed lower than the resonant frequency of the second oscillation system 46b. Therefore, the first oscillation system 46a more easily oscillates than the second oscillation system 46b. It is possible to prevent the movable plate 461b from being pivoted around the pivoting center axis J4 by the first voltage V1.

On the other hand, a magnetic field for attracting the S pole side of the permanent magnet 491 to the coil 492 and separating the N pole side from the coil 492 and a magnetic field for separating the S pole side of the permanent magnet 491 from the coil 492 and attracting the N pole side to the coil 492 are alternately switched by voltage corresponding to the second voltage V2 in the voltage V3. Consequently, the movable plate 461b pivots around the pivoting center axis J4 at the frequency of the second voltage V2 while torsionally deforming the second coupling sections 462b and 463b.

Since the frequency of the second voltage V2 is equal to the torsional resonant frequency of the second oscillation system 46b, the movable plate 461b can be dominantly pivoted around the pivoting center axis J4 by the second voltage V2. Therefore, it is possible to prevent the movable plate 461b from being pivoted around the pivoting center axis J3 together with the driving section 461a by the second voltage V2.

With the optical scanner 45 explained above, it is possible to two-dimensionally scan a laser beam (light) with one actuator and realize space saving for the light scanning unit 4. For example, when a pair of optical scanners are used as in the first embodiment, a relative positional relation between the optical scanners has to be highly accurately set. However, this is unnecessary in this embodiment. Therefore, it is possible to realize simplification of manufacturing.

In this embodiment, unlike FIGS. 7A and 7B in the first embodiment, when the laser beam (light) LL is two-dimensionally scanned on the display surface 91 in the light emission state in which the laser beam (light) LL is emitted from the light source unit 3 as shown in FIG. 23, plural rendering lines (scanning lines) L as tracks of the laser beam LL on the display surface 91 are arranged in a zigzag and in a curve.

Since the scanning lines are curved, the video-data calculating section 52 reads out video data from the video-data storing section 51 while calculating data equivalent to pixel data that should be rendered on a line to be scanned. After performing various correction operations or the like on the basis of rendering timing information input from the rendering-timing generating section 53, the video-data calculating section 52 sends luminance data of the respective colors to the light-source modulating section 54.

Concerning processing other than the above, processing same as the processing in the first embodiment is performed.

According to such a second embodiment, it is possible to show effects same as the effects in the first embodiment.

Third Embodiment

An image forming apparatus according to a third embodiment of the invention is explained below.

Figure 24:
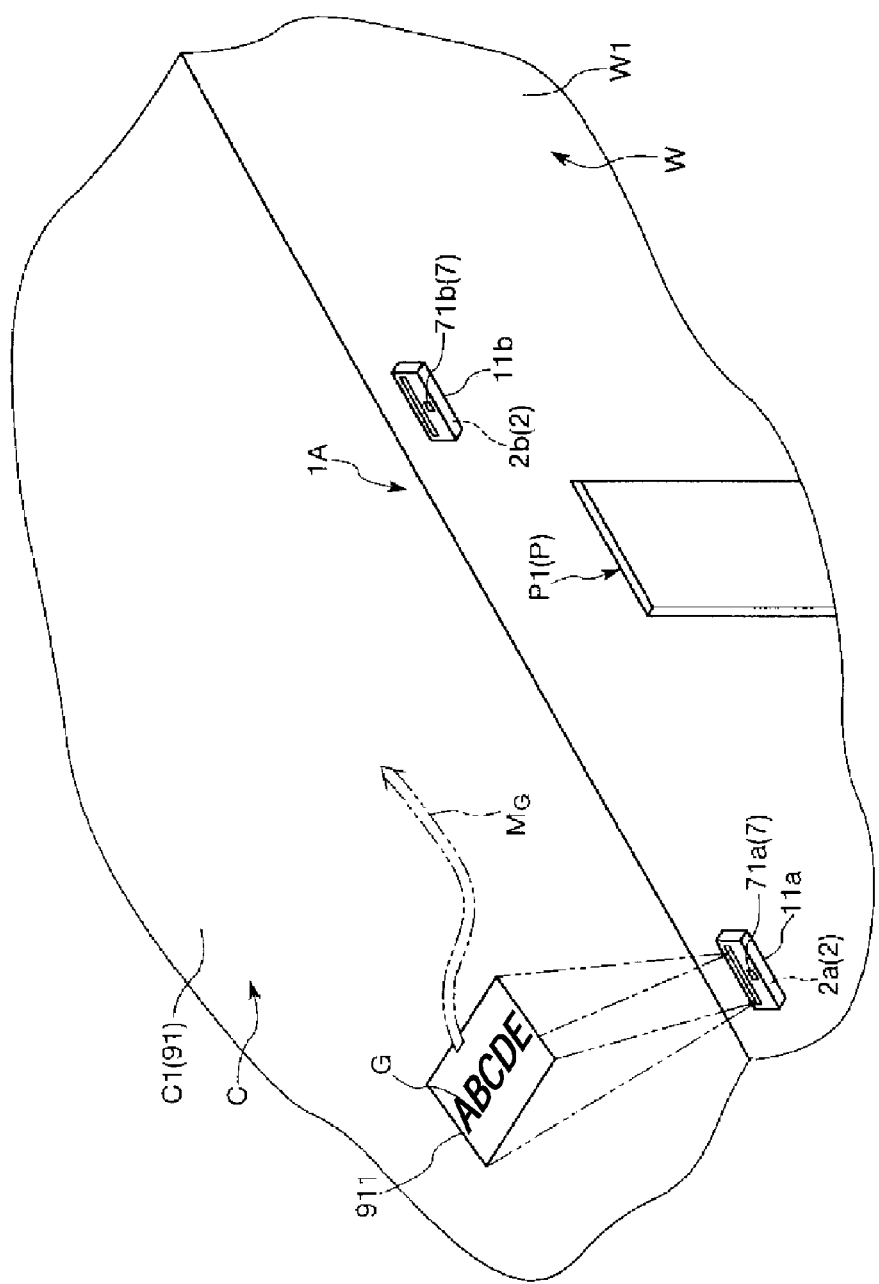
FIG. 24 is a diagram showing an image forming apparatus according to a third embodiment of the invention.

FIG. 24 is a diagram showing the image forming apparatus according to the third embodiment of the invention.

Concerning the image forming apparatus according to the third embodiment, differences from the image forming apparatuses according to the first and second embodiments are mainly explained below. Explanation of similarities is omitted.

The image forming apparatus according to the third embodiment is substantially the same as the image forming apparatus according to the first embodiment except that the arrangement of a display surface on which an image is displayed and the image forming apparatus is different. In FIG. 24, components same as those in the embodiments explained above are denoted by the same reference numerals and signs.

As shown in FIG. 24, in an image forming apparatus 1A, the display surface 91 is set on a ceiling surface C1 of a ceiling C. Specifically, the image forming apparatus 1A displays the image g in the rendering region 911 formed on the ceiling surface C1 serving as the display surface 91 and changes the position of the rendering region 911 according to a moving state of the person H present in the detection region S (performs movement $M_G$ of the rendering region 911).

The image forming apparatus 1A is provided on the wall W. More specifically, the image forming apparatus 1A is provided near a boundary between the wall W and the ceiling C.

In other words, in this embodiment, the rendering region 911 and the image forming apparatus 1 are set to be vertically reversed from the state in the first embodiment.

In this embodiment, optical paths of the laser beam LL emitted from the projectors 2 (2a and 2b) can be set to avoid a region where a person passes. Therefore, it is possible to more surely prevent the laser beam LL emitted from the projectors 2 from being blocked by a pedestrian or the like.

According to such a third embodiment, it is possible to show effects same as the effects in the first embodiment.

The image forming apparatus according to the invention is explained above on the basis of the embodiments shown in the figures. However, the invention is not limited to the embodiments. The configurations of the sections can be replaced with arbitrary configurations having the same functions. Other arbitrary components may be added to the invention. The invention may be an invention in which arbitrary two or more configurations (characteristics) in the embodiments are combined.

In the example explained in the embodiments, the display surface on which an image is displayed is set on the floor surface or the ceiling surface. However, such a display surface is not limited to this and may be, for example, a wall surface of a wall. Display surfaces may be respectively set on at least two surfaces of the floor surface, the wall surface, and the ceiling surface. For example, when a distance between the wall surface and the person is large, the rendering region may be formed on the floor surface or the ceiling surface. When the distance between the wall surface and the person is small, the rendering region may be formed on the wall surface. When the display surface is set on the wall surface, the rendering region is set higher than the line of sight of the person (e.g., equal to or higher than 180 cm) when the distance between the wall surface and the person is large and is set substantially the same as the line of sight of the person (e.g., about 160 cm) when the distance between the wall surface and the person is small.

Both the projector and the display surface may be set on the same surface (the wall surface, the floor surface, or the ceiling surface). It is also possible to set the projector on one of surfaces parallel to each other (e.g., wall surfaces or the floor surface and the ceiling surface) and set the display surface on the other.

In the example explained in the embodiments, the motor is used as the driving source for the unit pivoting unit and the scanner pivoting unit. However, the driving source is not limited to this and may be, for example, a solenoid.

In the example explained in the embodiments, the unit pivoting unit transmits the driving force of the motor to the supporting section using the pair of gears. However, such a driving force transmitting system is not limited to this and may be, for example, a system such as belt drive or may be a system in which a shaft of the motor is directly attached to the supporting section.

The rendering-position changing unit can also be realized by providing a pivotable optical component such as a mirror or a prism in an optical path between the optical scanner 41 and the optical scanner 42.

The rendering-position changing unit can also be realized by changing the center position of amplitude in the pivoting of the movable plates of the optical scanners 41 and 42. In this case, for example, biases having different voltages only have to be selectively superimposed on a driving signal.

In the first embodiment, the pair of optical scanners are used as the light scanning unit. However, the light scanning unit is not limited to this. For example, an optical scanner and a galvanometer mirror may be used. In this case, the galvanometer mirror is desirably used for vertical scanning.

In the embodiments, the image forming apparatus includes the two projectors. However, the number of projectors included in the image forming apparatus is not limited to this and may be one or may be three or more.

In the embodiments, the first direction is the "horizontal direction" and the second direction is the "vertical direction". However, in the invention, the first direction and the second direction are not limited to this and may be, for example, the "vertical direction" and the "horizontal direction", respectively.

In the embodiments, the red laser beam, the green laser beam, and the blue laser beam are combined to emit one laser beam (light) using the three dichroic mirrors. However, the laser beams may be combined using dichroic prisms or the like.

In the configuration explained in the embodiments, the light source unit 3 includes the laser beam source that emits the red laser, the laser beam source that emits the blue laser, and the laser beam source that emits the green laser. However, the light source unit 3 is not limited to this and may include, for example, the laser beam source that emits the red laser, the laser beam source that emits the blue laser, and a laser beam source that emits an ultraviolet laser. In this case, a fluorescent substance that generates green fluorescent light according to irradiation of the ultraviolet laser is included in the screen. This makes it possible to display a full-color image on the display surface.

In the embodiments, the projector that displays an image by performing raster scan is used. However, a projector that displays an image by performing vector scan can also be used.

In the embodiments, the projector of the light scanning type is used. However, other projectors that project an image on the display surface using a liquid crystal panel, a DMD (Digital Micromirror Device), and the like can also be used.

The entire disclosure of Japanese Patent Application No. 2010-034384, filed Feb. 19, 2010 is expressly incorporated by reference herein.

What is claimed is:

1. An image forming apparatus comprising:
a projector configured to be capable of projecting light to thereby display an image on a rendering region formed on a display surface set around a guiding point to which a person should be guided and changing a position of the rendering region;
a detecting unit that detects whether a person is present in a detection region set near the display surface and detects, when a person is present in the detection region, a moving state of the person;

a control unit that controls, on the basis of a detection result of the detecting unit, driving of the projector to guide the person present in the detection region to the guiding point;

a light emitting unit that emits a laser beam; and a light scanning unit that scans the laser beam emitted from the light emitting unit in a first direction and a second direction orthogonal to each other, wherein the projector includes a unit pivoting unit that pivots the light emitting unit and the light scanning unit integrally around at least one axis of two axes orthogonal to each other.

2. The image forming apparatus according to claim 1, wherein the projector is configured to be capable of continuously or intermittently changing the position of the rendering region.

3. The image forming apparatus according to claim 1, wherein the control unit controls, when the person is moving in the detection region, the driving of the projector to change the position of the rendering region while maintaining a state in which a center of the rendering region is located on a forward side in a moving direction of the person and on the guiding point side with respect to the person.

4. The image forming apparatus according to claim 1, wherein the detecting unit detects a position, a moving direction, and moving speed of the person as the moving state of the person.

5. The image forming apparatus according to claim 1, wherein the projector includes a distortion correcting unit that corrects distortion of the rendering region and the image, and the control unit controls driving of the distortion correcting unit on the basis of a detection result of the detecting unit.

6. The image forming apparatus according to claim 1, wherein the light scanning unit includes an optical scanner in which a movable plate including a light reflecting section that reflects the light emitted from the light emitting unit is provided pivotably around one axis or two axes orthogonal to each other, the optical scanner scanning the light reflected by the light reflecting section according to the pivoting.

7. The image forming apparatus according to claim 3, wherein the control unit controls, when the person is moving in the detection region, the driving of the projector to maintain the position of the rendering region at a fixed separation distance from a position of the person.

8. The image forming apparatus according to claim 4, wherein the detecting unit includes:

a human sensor that detects whether a person is present in the detection region and detects, when a person is present in the detection region, a position of the person;

a storing section that stores, at every predetermined time, the position detected by the human sensor as position information; and a calculating section that calculates a moving direction and moving speed of the person on the basis of the position information stored in the storing section.

9. The image forming apparatus according to claim 5, wherein the control unit controls the driving of the distortion correcting unit to fix directions of the rendering region and the image with respect to the person.

10. The image forming apparatus according to claim 5, wherein the control unit controls the driving of the distortion correcting unit to fix a shape of the rendering region.

11. The image forming apparatus according to claim 5, wherein the control unit controls the driving of the distortion correcting unit to fix a dimension of the rendering region.

12. The image forming apparatus according to claim 6, wherein the projector includes a scanner pivoting unit that pivots the entire optical scanner around at least one axis of the two axes orthogonal to each other with respect to light emitting unit.

* * * * *